(12) United States Patent
Kim

(10) Patent No.: US 12,525,024 B2
(45) Date of Patent: Jan. 13, 2026

(54) ELECTRONIC DEVICE, METHOD, AND COMPUTER READABLE STORAGE MEDIUM FOR DETECTION OF VEHICLE APPEARANCE

(71) Applicant: THINKWARE CORPORATION, Seongnam-si (KR)

(72) Inventor: Shinhyoung Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 720 days.

(21) Appl. No.: 17/715,145

(22) Filed: Apr. 7, 2022

(65) Prior Publication Data

US 2022/0335728 A1   Oct. 20, 2022

(30) Foreign Application Priority Data

Apr. 14, 2021   (KR) .......................... 10-2021-0048514

(51) Int. Cl.

| | |
|---|---|
| G06V 20/58 | (2022.01) |
| G06T 7/13 | (2017.01) |
| G06T 7/70 | (2017.01) |
| G06V 10/774 | (2022.01) |

(52) U.S. Cl.
CPC ................ *G06V 20/58* (2022.01); *G06T 7/13* (2017.01); *G06T 7/70* (2017.01); *G06V 10/7747* (2022.01); *G06T 2207/10016* (2013.01); *G06T 2207/30252* (2013.01)

(58) Field of Classification Search
None
See application file for complete search history.

(56) References Cited

FOREIGN PATENT DOCUMENTS

WO   WO-2016168555 A1 * 10/2016 ............. G08G 1/142

OTHER PUBLICATIONS

Bianco, Simone, et al. "An interactive tool for manual, semi-automatic and automatic video annotation." Computer Vision and Image Understanding 131 (2015): 88-99. (Year: 2015).*

Manikandan, N. S., and K. Ganesan. "Deep learning based automatic video annotation tool for self-driving car." arXiv preprint arXiv: 1904.12618 (2019). https://arxiv.org/abs/1904.12618. (Year: 2019).*

(Continued)

*Primary Examiner* — Matthew C Bella
*Assistant Examiner* — Johnny B Duong
(74) *Attorney, Agent, or Firm* — WHDA, LLP

(57) ABSTRACT

According to various embodiments, an electronic device include a display, an input circuit, at least one memory and at least one processor configured to obtain a first image; display, in response to cropping an area comprising a visual object corresponding to a potential vehicle appearance from the first image, fields for inputting an attribute for the area, wherein, the fields include a first field for inputting a vehicle type as the attribute and a second field for inputting a positional relationship between a subject corresponding to the potential vehicle appearance and a camera obtained the first image as the attribute; obtain information about the attribute, by receiving a user input for each of the fields including the first field and the second field through the input circuit; store a second image configured of the area in a data set for training a computer vision model for vehicle detection.

10 Claims, 31 Drawing Sheets

(56) References Cited

OTHER PUBLICATIONS

Rani, N. Shobha, Neethu OP, and Nila Ponnath. "Automatic Vehicle Tracking System Based on Fixed Thresholding and Histogram Based Edge Processing." International Journal of Electrical & Computer Engineering (2088-8708) 5.4 (2015). (Year: 2015).*

Supervisely. "Tags for image labeling. An overview—Supervisely Fundamentals". YouTube. https://www.youtube.com/watch?v=6Sy2hZzq9OY. Accessed Jan. 17, 2025. (Year: 2020).*

Van De Weijer, Joost, et al. "Learning color names for real-world applications." IEEE Transactions on Image Processing 18.7 (2009): 1512-1523. (Year: 2009).*

Hachiya, Hirotaka, et al. "Distance estimation with 2.5 D anchors and its application to robot navigation." ROBOMECH Journal 5 (2018): 1-13. (Year: 2018).*

Brosh, Eli, et al. "Accurate visual localization for automotive applications." Proceedings of the IEEE/CVF Conference on Computer Vision and Pattern Recognition Workshops. 2019. (Year: 2019).*

Petrovai, Andra, Arthur D. Costea, and Sergiu Nedevschi. "Semi-automatic image annotation of street scenes." 2017 IEEE intelligent vehicles symposium (IV). IEEE, 2017. (Year: 2017).*

* cited by examiner

800

820

830

ELECTRONIC DEVICE, METHOD, AND COMPUTER READABLE STORAGE MEDIUM FOR DETECTION OF VEHICLE APPEARANCE

CROSS-REFERENCE TO RELATED APPLICATION(S)

This application is based on and claims priority under 35 U.S.C. § 120 to Korean Patent Application No. 10-2021-0048514, filed on Apr. 14, 2021, in the Korean Intellectual Property Office, the disclosure of which are incorporated by reference herein their entirety.

BACKGROUND

Technical Field

The following descriptions relate to an electronic device, method, and computer readable storage medium for detecting the appearance of a vehicle.

Description of Related Art

Autonomous driving means driving a vehicle without a user input of a driver or passenger. Such autonomous driving may be classified into levels in which a driver or a passenger monitors a driving environment and levels in which an autonomous driving system related to a vehicle monitors a driving environment. For example, the levels in which the driver or passenger monitors the driving environment comprise level 1 (drive assistance level) which corresponds to the stage in which the driver performs all functions for dynamic driving of the vehicle, although the steering support system or acceleration/deceleration support system is executed within the vehicle and level 2 (partial automation level) in which the monitoring of the driving environment is performed by the driver's operation, although the steering support system or acceleration/deceleration support system is executed within the vehicle. For example, the levels in which the autonomous driving system related to the vehicle monitors the driving environment comprise levels 3 (conditional automation level) in which the driver must control when the autonomous driving system requests the driver's intervention, although the autonomous driving system controls all aspects of the operation related to driving, level 4 (high automation level) requiring partial driver intervention, although the autonomous driving system related to the vehicle performs all of a core control for driving, monitoring the driving environment, and handling with emergencies and level 5 (full automation) in which the autonomous driving system related to the vehicle always performs driving under all road conditions and environments.

SUMMARY

A vehicle capable of autonomous driving essentially requires obtaining information on a state around the vehicle. For example, a vehicle capable of autonomous driving may obtain information on whether another vehicle is located around the vehicle as information on a state around the vehicle. For example, the vehicle may identify whether the other vehicle is located around the vehicle by detecting the vehicle appearance from the image.

The technical problems to be achieved in this document are not limited to those described above, and other technical problems not mentioned herein will be clearly understood by those having ordinary knowledge in the art to which the present disclosure belongs, from the following description.

According to various embodiments, an electronic device may comprise a display, an input circuit, at least one memory configured to store instructions and at least one processor which, when executing the instructions, configured to obtain a first image; display, in response to cropping an area comprising a visual object corresponding to a potential vehicle appearance from the first image, fields for inputting an attribute for the area via the display, wherein, the fields include a first field for inputting a vehicle type as the attribute and a second field for inputting a positional relationship between a subject corresponding to the potential vehicle appearance and a camera obtained the first image as the attribute; obtain, while displaying the fields, information about the attribute, by receiving a user input for each of the fields including the first field and the second field through the input circuit; store, in response to obtaining the information, a second image configured of the area in a data set for training a computer vision model for vehicle detection.

According to various embodiments, a method for operating an electronic device having a display and an input circuit may comprise obtaining a first image, displaying, in response to cropping an area comprising a visual object corresponding to a potential vehicle appearance from the first image, fields for inputting an attribute for the area via the display, wherein, the fields include a first field for inputting a vehicle type as the attribute and a second field for inputting a positional relationship between a subject corresponding to the potential vehicle appearance and a camera obtained the first image as the attribute; obtaining, while displaying the fields, information about the attribute, by receiving a user input for each of the fields including the first field and the second field through the input circuit; storing, in response to obtaining the information, a second image configured of the area in a data set for training a computer vision model for vehicle detection.

According to various embodiments, a non-transitory computer readable storage medium storing one or more programs, the one or more programs comprising instructions which, when executed by at least one processor of an electronic device with a display and an input circuit, cause the electronic device to obtain a first image; display, in response to cropping an area comprising a visual object corresponding to a potential vehicle appearance from the first image, fields for inputting an attribute for the area via the display, wherein, the fields include a first field for inputting a vehicle type as the attribute and a second field for inputting a positional relationship between a subject corresponding to the potential vehicle appearance and a camera obtained the first image as the attribute; obtain, while displaying the fields, information about the attribute, by receiving a user input for each of the fields including the first field and the second field through the input circuit; store, in response to obtaining the information, a second image configured of the area in a data set for training a computer vision model for vehicle detection.

According to various embodiments, an electronic device in the vehicle may comprise a memory including a trained computer vision model and instructions, and at least one processor which, when executing the instructions, configured to obtain a video sequence via a camera related to the vehicle; in response to detecting a visual object corresponding to a potential vehicle appearance within the obtained video sequence, identify whether the visual object is maintained for a predetermined time in the video sequence; in response to identifying that the visual object is maintained for the predetermined time in the video sequence, determine whether the visual object corresponds to a vehicle appearance using the trained computer vision model; in response to identifying that the visual object is not maintained for the predetermined time in the video sequence, bypass determining whether the visual object corresponds to a vehicle appearance using the trained computer vision model.

According to various embodiments, a method for operating an electronic device in a vehicle including a trained computer vision model may comprise obtaining a video sequence via a camera related to the vehicle; in response to detecting a visual object corresponding to a potential vehicle appearance within the obtained video sequence, identifying whether the visual object is maintained for a predetermined time in the video sequence; in response to identifying that the visual object is maintained for the predetermined time in the video sequence, determining whether the visual object corresponds to a vehicle appearance using the trained computer vision model; in response to identifying that the visual object is not maintained for the predetermined time in the video sequence, bypassing determining whether the visual object corresponds to a vehicle appearance using the trained computer vision model.

According to various embodiments, a computer-readable storage medium may store one or more programs including instructions which, when executed by at least one processor of an electronic device in a vehicle including a trained computer vision model, cause the electronic device to obtain a video sequence via a camera related to the vehicle; in response to detecting a visual object corresponding to a potential vehicle appearance within the obtained video sequence, identify whether the visual object is maintained for a predetermined time in the video sequence; in response to identifying that the visual object is maintained for the predetermined time in the video sequence, determine whether the visual object corresponds to a vehicle appearance using the trained computer vision model; in response to identifying that the visual object is not maintained for the predetermined time in the video sequence, bypass determining whether the visual object corresponds to a vehicle appearance using the trained computer vision model.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
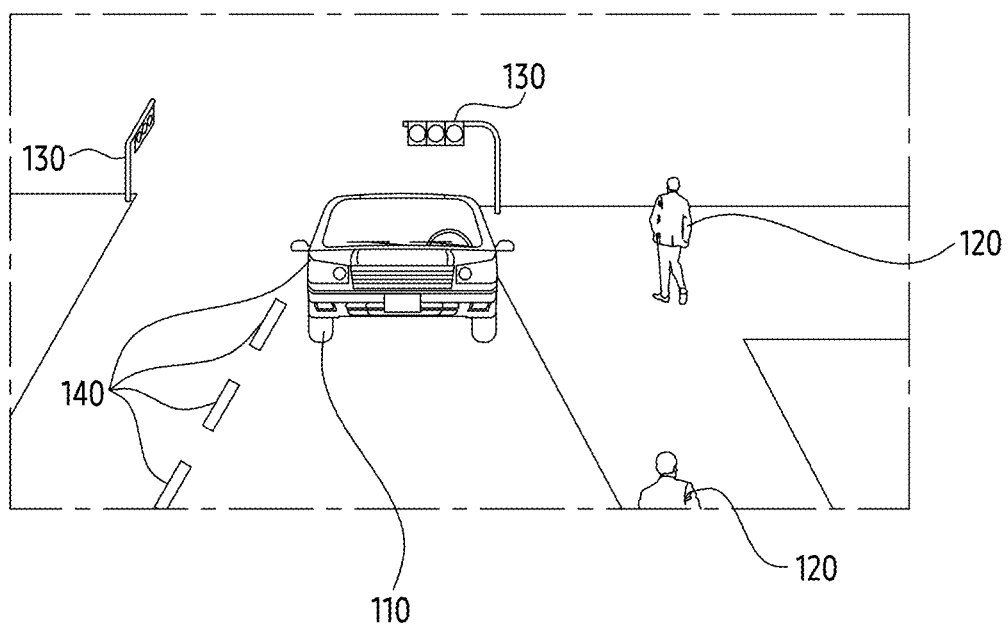
FIG. 1 illustrates an example of an image obtained through a camera exposed through at least a part of a vehicle.

An electronic device, a method, and a computer readable storage medium according to various embodiments can enhance the efficiency of training of the computer vision model by obtaining information on attributes for potential vehicle appearance based on a user input and storing the obtained information as a data set for training a computer vision model.

An electronic device, a method, and a computer-readable storage medium according to various embodiments may enhance the efficiency of an operation for detecting whether an object around a vehicle corresponds to the appearance of the vehicle by identifying whether a visual object corresponding to a potential vehicle appearance is maintained within a video sequence for a predetermined time.

Hereinafter, various embodiments of the present document will be described with reference to the accompanying drawings.

The various embodiments and terms used herein are not intended to limit the technical features described herein to specific embodiments and should be understood to include various modifications, equivalents, or substitutes of the embodiment. With respect to the description of the drawings, similar reference numerals may be used for similar components. A singular expression may include multiple expressions unless the context clearly indicates otherwise. In this document, expressions such as "A or B", "At least one of A and/or B", "A, B or C", or "At least one of A, B and/or C" may include all possible combinations of listed items together. Expressions such as "the first", "the second", "first", or "second" may modify the corresponding components regardless of order or importance and be used to distinguish one component from another and do not limit the components. When some component (e.g., the first) is referred to as "coupled" or "connected" to another component (e.g., the second) (functionally or communicatively), The one component may be directly connected to the other component or may be connected through another component (e.g., a third component).

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

FIG. 1 illustrates an example of an image obtained through a camera exposed through at least a part of a vehicle.

Referring to FIG. 1, an image 100 may be obtained through a camera exposed through at least a part of a vehicle. For example, the camera may be disposed in the vehicle such that an optical axis (or FOV(field of view)) of the camera faces the front of the vehicle. In some embodiments, the camera may be embedded in the vehicle when the vehicle is released. In some other embodiments, the camera may be embedded in the vehicle after the vehicle is released. In some other embodiments, the camera may be detachably attached to the vehicle after the vehicle is released. For example, the camera may be a dash cam detachably attached to the vehicle after the vehicle is released. For another example, the camera may be a camera of a user's mobile device that may be mounted on a vehicle, such as a smartphone or a tablet PC. However, it is not limited thereto.

In various embodiments, image 100 may comprise information on the front of the vehicle. For example, the image 100 may comprise a visual object 110 located in front of the vehicle, corresponding to the appearance of the vehicle. For another example, image 100 may comprise visual object 120 corresponding to a human appearance located in front of the vehicle. For another example, the image 100 may comprise a visual object 130 corresponding to the appearance of a traffic light located in front of the vehicle. For another example, the image 100 may include a visual object 140 corresponding to a lane appearance located around the vehicle. However, it is not limited thereto.

In various embodiments, the image 100 obtained through the camera may be provided to an electronic device included in the vehicle or an electronic device related to the vehicle. image 100 may be provided to a computer vision model related to the electronic device to extract information from image 100 obtained by the electronic device included in the vehicle or the electronic device related to the vehicle. According to embodiments, image 100 may be processed by the electronic device and then provided to the computer vision model. However, it is not limited thereto.

Figure 2:
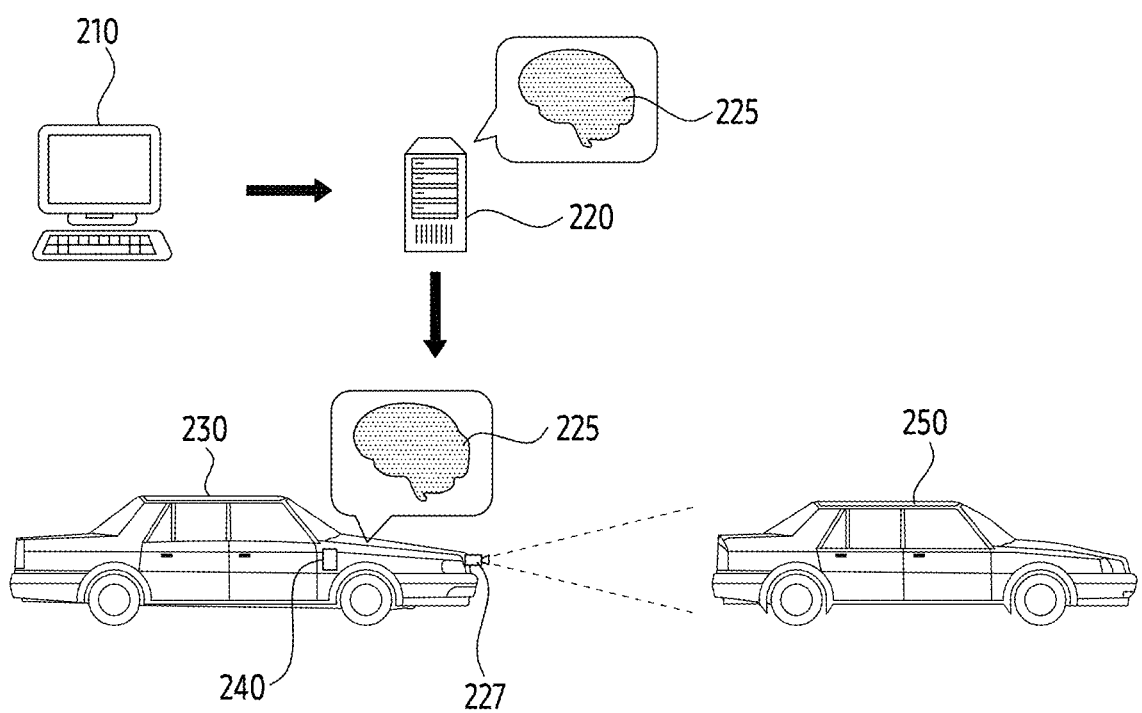
FIG. 2 illustrates an example of an environment including electronic devices according to various embodiments.

FIG. 2 illustrates an example of an environment including electronic devices according to various embodiments.

Referring to FIG. 2, the environment 200 may comprise an electronic device 210, an electronic device 220, and an electronic device 240.

In various embodiments, electronic device 210 may be used to obtain a data set for computer vision model 225 trained by electronic device 220.

For example, the electronic device 210 may obtain an image including a visual object corresponding to a vehicle appearance. The electronic device 210 may obtain information on the visual object included in the obtained image or information on attributes of an area including the visual object based on a user input. The electronic device 210 may store at least a portion of the obtained image in the data set, in connection with the information on the attribute. The electronic device 210 may provide the data set to the electronic device 220.

In various embodiments, the electronic device 220 may be used to train the computer vision model 225.

For example, the electronic device 220 may obtain the data set from the electronic device 210. The electronic device 220 may provide the data set to the computer vision model 225. For example, the computer vision model 225 may be a model trained by the electronic device 220 to provide information on whether there is a visual object corresponding to the appearance of the vehicle in the image obtained through the camera 227 related to the vehicle 230 to the electronic device 240 included in the vehicle 230. For example, the computer vision model 225 may be stored in the electronic device 220 for the training. As another example, the computer vision model 225 may be in communication connection with the electronic device 220 for the training. However, it is not limited thereto.

Meanwhile, the computer vision model 225 may obtain the data set from the electronic device 220. The computer vision model 225 may perform training based on the data set. For example, the computer vision model 225 may perform training based on information on an image (or part of an image) in the dataset and the attribute associated with the image (or part of the image) in the dataset. The computer vision model 225 may extract feature points from the image (or a part of the image) during the training and obtain relationship information between the extracted feature points and information on the attribute. For example, extraction of the feature points may be performed based on grayscale intensity, RGB (red, green, blue) color information, HSV (hue, saturation, value) color information, YIQ color information, edge information (grayscale, binary, eroded binary) and etc.

In various embodiments, the computer vision model 225 may determine whether a visual object corresponding to the appearance of the vehicle is included in the image based on the relationship information. When the reliability of the determination reaches more than the reference reliability, the computer vision model 225 trained by the electronic device 220 may be related to the electronic device 240. For example, the computer vision model 225 trained by the electronic device 220 may be included in the electronic device 240. For another example, the computer vision model 225 trained by the electronic device 220 may be located at the vehicle 230 as a device distinguished from the electronic device 220 and may be connected to the electronic device 240 by wireless or by wire. For another example, the computer vision model 225 trained by the electronic device 220 may be located outside the vehicle 230 with a device distinguished from the electronic device 220 and may be connected to the electronic device 240 by wireless or by wire. However, it is not limited thereto.

For example, the computer vision model 225 related to the electronic device 240 may determine whether a visual object corresponding to the appearance of the vehicle is included in the image obtained through the camera 227.

In various embodiments, electronic device 240 may be an electronic device included in vehicle 230. In various embodiments, the electronic device 240 may be embedded in the vehicle 230 before the vehicle 230 is released. In various embodiments, the electronic device 240 may be embedded in the vehicle 230 through a separate process after the vehicle 230 is released. In various embodiments, the electronic device 240 may be detachably attached to the vehicle 230 after the vehicle 230 is released. However, it is not limited thereto.

In various embodiments, the electronic device 240 may be used to determine whether a visual object corresponding to the appearance of the vehicle is included in the image obtained through the camera 227 related to the electronic device 240. For example, the electronic device 240 may determine that a visual object corresponding to the vehicle 250 located in the FOV of the camera 227 is included in the image obtained through the camera 227 using the computer vision model 225 trained by the electronic device 220.

FIG. 2 illustrates an example in which the position of the camera 227 is located at the front surface of the vehicle, but this is for convenience of description. According to embodiments, the position of the camera 227 may be changed. For example, the camera 227 may be located on a dashboard of the vehicle or a windshield upper portion or a room mirror. For another example, the camera 227 may be located at an appropriate position on the rear of the vehicle.

Figure 3:
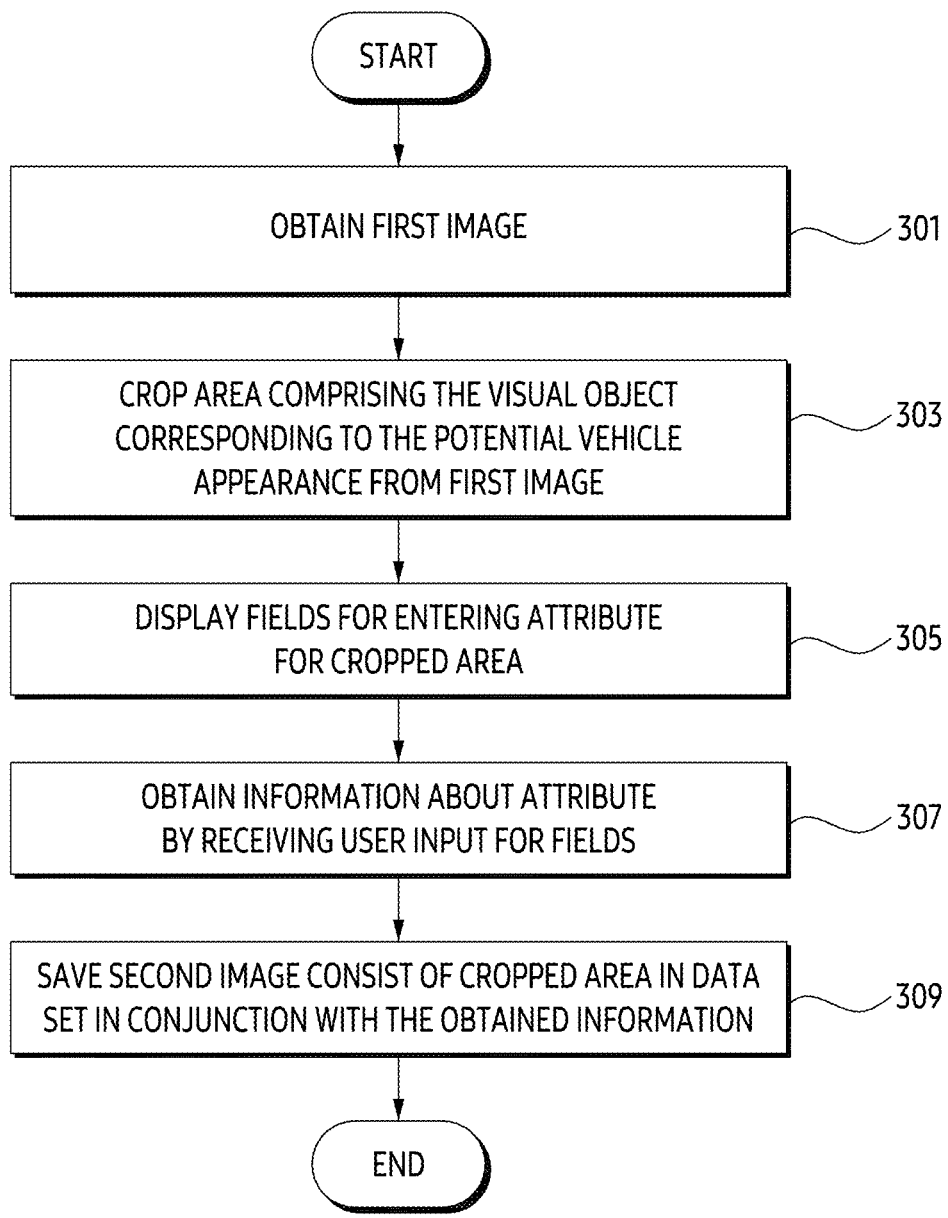
FIG. 3 is a flowchart illustrating a method of storing a data set for training of a computer vision model according to various embodiments.

FIG. 3 is a flowchart illustrating a method of storing a data set for training a computer vision model according to various embodiments. This method may be executed by the electronic device 210 or the processor of the electronic device 210 illustrated in FIG. 2.

Figure 4:
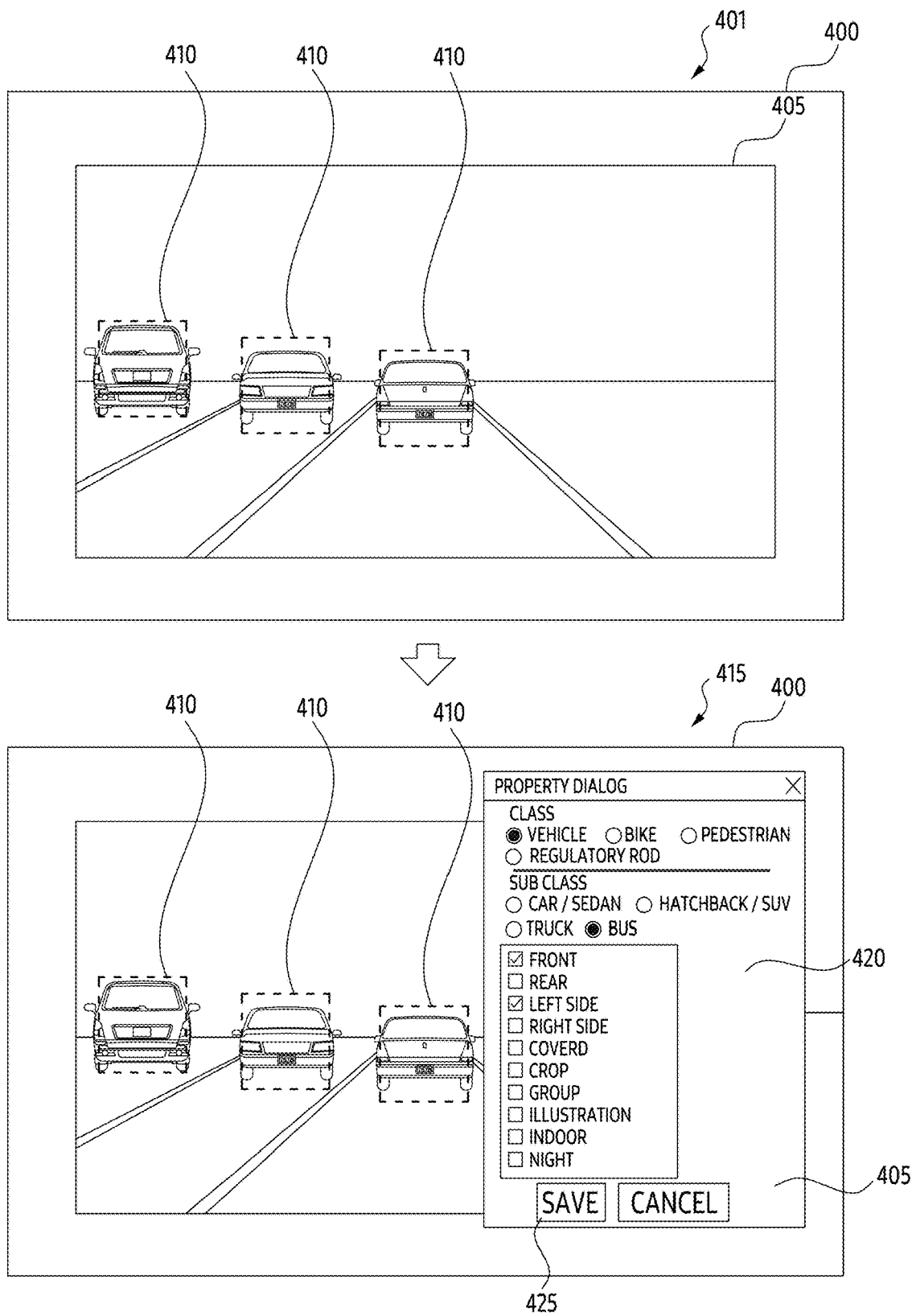
FIG. 4 illustrates an example of a user interface displayed on a display of an electronic device according to various embodiments.

FIG. 4 illustrates an example of a user interface displayed on a display of an electronic device according to various embodiments.

Referring to FIG. 3, in operation 301, the electronic device 210 may obtain a first image. For example, the electronic device 210 may obtain the first image by receiving information on the first image obtained by an external electronic device from the external electronic device. For another example, the electronic device 210 may obtain the first image from a camera of the electronic device 210 or an external camera connected to the electronic device 210.

In operation 303, the electronic device 210 may crop an area including a visual object corresponding to a potential vehicle appearance from the first image based on obtaining the first image. In various embodiments, the visual object corresponding to the potential vehicle appearance may be a visual object identified by electronic device 210 as corresponding to the vehicle appearance based on analysis of the first image. For example, since the visual object in the first image is a visual object identified based on analysis of the electronic device 210 and may correspond to another subject distinguished from a vehicle, the visual object in the first image may be represented in this document as corresponding to a potential vehicle appearance in this document.

Meanwhile, according to embodiments, the electronic device 210 may display the first image through the display of the electronic device 210, receive a user input defining the area including the visual object corresponding to the potential vehicle appearance in the first image from a user looking at the first image displayed through the display of the electronic device 210, and crop the area including the visual object corresponding to the potential vehicle appearance from the first image based on the received user input. However, it is not limited thereto. Meanwhile, the user input may comprise a handwritten input in which the user directly draws the area or a tap input for selecting the visual object.

Meanwhile, in various embodiments, the electronic device 210 may display information for indicating the area cropped from the first image through the display of the electronic device 210. For example, referring to FIG. 4, the electronic device 210 may display the user interface 400 in state 401 through the display of the electronic device 210. For example, the electronic device 201 may be in state 401 in response to cropping the area. For example, in state 401, the user interface 400 may be provided by an application used to store the data set. For example, in state 401, the user interface 400 may comprise a first image 405. In state 401, the first image 405 displayed in the user interface may comprise information 410 for indicating the area cropped from the first image. For example, in state 401, the information 410 may overlap on the first image 405. In state 401, the shape or color of the information 410 overlapped on the first image may be changed based on the probability that the visual object in the information 410 corresponds to the vehicle appearance. For example, the probability may be a probability calculated by the electronic device 210. For example, when the probability that the first visual object in the first image 405 corresponds to the vehicle appearance is 70%, and the probability that the second visual object in the first image 405 corresponds to the vehicle appearance vehicle is 25%, the shape or color of the information 410 for indicating the area including the first visual object may be distinguished from the shape or color of the information 410 for indicating the area including the second visual object. For example, information 410 for indicating the area including the first visual object may be emphasized more than information 410 for indicating the area including the second visual object. However, it is not limited thereto.

In operation 305, the electronic device 210 may display fields for inputting attributes for the area through the display of the electronic device 210 in response to cropping the area.

In various embodiments, the fields may include a first field for inputting a vehicle model of a vehicle appearance corresponding to the visual object in the area as the attribute. For example, the vehicle may be divided into a sedan, a sport utility vehicle (SUV), a recreational vehicle (RV), a hatchback, a truck, a bus, and the like. In this case, the first field may include an input field for inputting the vehicle model.

In various embodiments, the fields may further comprise a second field for inputting a positional relationship between the subject corresponding to the vehicle appearance in the area and the camera obtained the first image as the attribute.

For example, the positional relationship may comprise a distance between the subject and the camera. For example, the distance may be divided into a short distance and a long distance. In this case, the second field may comprise an input field for inputting that the distance between the camera and the subject is a long distance equal to or greater than a predetermined distance and an input field for inputting that the distance between the camera and the subject is short distance less than the predetermined distance. For another example, the distance may be divided into a short distance, a medium distance, and a long distance. The second field may comprise an input field for inputting that the distance between the camera and the subject is short distance less than or equal to a first predetermined distance, an input field for inputting that the distance between the camera and the subject is medium distance greater than or equal to the first predetermined distance and less than or equal to the second predetermined distance, and an input field for inputting that the distance between the camera and the subject is a long distance greater than or equal to the second predetermined distance.

For another example, the positional relationship may comprise an angle between the optical axis of the lens of the camera and a straight line connecting the center point of the lens and one point of the subject. For example, the angle may be expressed as "the angle between the optical axis and the subject" in the present document. For example, in order to input that the subject is positioned on the left side based on the optical axis, the subject is positioned on the right side based on the optical axis, and the subject is positioned on the front side based on the optical axis, the second field may further comprise an input field for inputting whether the angle is within a first predetermined range, within a second predetermined range distinguished from the first predetermined range, or within a third predetermined range distinguished from the first predetermined range and a second predetermined range. However, it is not limited thereto.

In various embodiments, the fields may further include a third field for inputting illuminance at the time of obtaining the first image or brightness of the area in the first image as the attribute. For example, the third field may comprise an input field for explicitly inputting a value for indicating the brightness or the illuminance. As another example, the third field may comprise an input field for inputting information for implicitly indicating the brightness or the illuminance. For example, the information for implicitly indicating the brightness or the illuminance may be expressed as information on weather when the first image is obtained, or as information on whether the time when the first image is obtained is daytime or nighttime. However, it is not limited thereto.

In various embodiments, the fields may further comprise a fourth field for inputting a color of the visual object (or the subject) as the attribute. For example, the fourth field may comprise an input field for explicitly inputting at least one value for indicating the color. As another example, the fourth field may include an input field for inputting an intuitive color (e.g., red, orange, yellow, green, blue, navy, purple and etc.) recognized by a user viewing the first image as the attribute. However, it is not limited thereto.

In various embodiments, the fields may further comprise a fifth field for inputting whether the visual object represents a state in which a part of the subject is covered by an object positioned between the subject and the camera as the attribute.

In various embodiments, the fields may further comprise a sixth field for inputting whether the visual object in the first image represents only a part of the subject as the attribute. For example, when only a part of the subject is comprised in the FOV by positioning the subject at an edge of an area covered by a field of view (FOV) of a camera used to obtain the first image, the sixth field may be used to input, as the attribute, that the visual object in the first image represents only a part of the subject. For example, the sixth field may be used to train the computer vision model 225 to detect other vehicles that cuts in the first lane from the second lane located next to the first lane while the vehicle 230 is autonomously driving across the first lane. In other words, the sixth field may be used to train the computer vision model 225 to detect the other vehicle newly entering from the edge of the FOV of the camera 227.

For example, referring to FIG. 4, the electronic device 210 may switch the state 401 to the state 415 in response to a user input for the information 410 displayed in state 401. For example, the user input for information 410 may include an input for selecting the displayed information 410 in state 401. In state 415, the electronic device 210 may display fields 420 in the user interface 400. According to embodiments, fields 420 may overlap at least a portion of the first image 405. For example, when the fields 420 overlap a portion of the first image 405, the position at which the fields 420 are displayed may be changed according to the position of the information 410 selected by the user input. For example, the fields 420 may be displayed overlapping on a portion of the first image 405 at a position where the information 410 selected by the user input is not covered. However, it is not limited thereto. The fields 420 may comprise at least some of the first to sixth fields.

In operation 307, the electronic device 210 may obtain information on the attribute by receiving a user input for the displayed fields. In various embodiments, information on the attribute may be obtained by the user input to provide computer vision model 225 what the visual object in the area is.

According to embodiments, some of the information on the attribute in operation 307 may be obtained by processing the computer vision model 225 without user input, depending on the degree of training of the computer vision model 225. For example, when computer vision model 225 may estimate some of the information on the attribute with reliability greater than or equal to reference reliability, some of the information on the attribute may be obtained by computer vision model 225 without user input. In this case, some of the fields 420 of FIG. 4 may be displayed in an input state without a user input. However, it is not limited thereto.

In operation 309, the electronic device 210 may store the second image consisting of the cropped area in a data set in connection with the obtained information on the attribute.

For example, the data set may be a data set for training the computer vision model 225 for vehicle detection. For example, referring to FIG. 4, in response to receiving a user input for executable object 425 in fields 420, electronic device 210 may store the second image in the dataset in connection with information on the attribute. For example, unlike the first image 405, the second image may be composed of only an area indicated by the information 410.

As described above, electronic device 210 according to various embodiments may obtain a data set for training computer vision model 225 for vehicle detection. The electronic device 210 according to various embodiments may display a user interface on a display to obtain the data set. In other words, the electronic device 210 according to various embodiments may provide simplification and intuition of user input for training of the computer vision model 225 by displaying the user interface.

The user interface displayed by the electronic device 210 according to various embodiments may provide the fields for inputting information on attributes for an area including a visual object corresponding to a potential vehicle appearance, cropped by the electronic device 210. For example, the electronic device 210 may provide a data set for efficiently training the computer vision model 225 by providing the above-described fields in order to input information on the attribute. In other words, the electronic device 210 according to various embodiments may enhance resource efficiency of training of the computer vision model 225.

Figure 5:
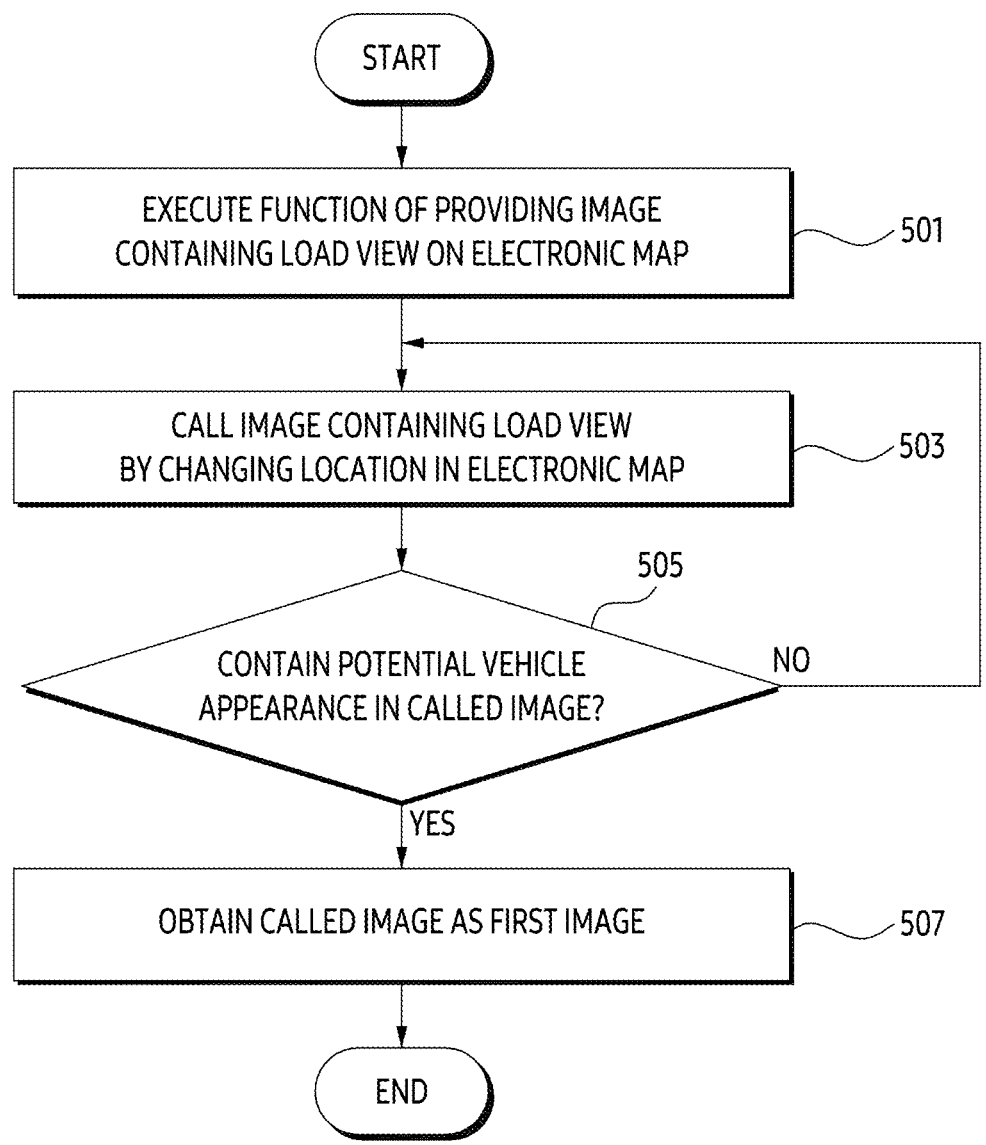
FIG. 5 is a flowchart illustrating a method of obtaining a first image from a road view according to various embodiments.

FIG. 5 is a flowchart illustrating a method of obtaining a first image from a road view according to various embodiments. This method may be executed by the electronic device 210 illustrated in FIG. 2 or a processor of the electronic device 210.

Operations 501 to 507 of FIG. 5 may be related to operations 301 of FIG. 3.

Referring to FIG. 5, in operation 501, the electronic device 210 may execute a function of providing an image including a road view on an electronic map provided by an application installed in the electronic device 210. For example, the image including the road view may be an image obtained through a camera of an actual location corresponding to a location on the electronic map, and may be an image provided in connection with the electronic map. For example, the image including the road view may be configured as a panoramic image.

In operation 503, after executing a function of providing an image including the road view, the electronic device 210 may call an image including the road view by changing a position where the road view is to be provided in the electronic map without user input. For example, the electronic device 210 may call an image including a road view for the second location by changing the selected location in the electronic map from the first location to the second location without user input. For example, the electronic device 210 may call the image including a road view for the second location by changing a position selected in the electronic map from the first position to the second position without a user input through the application providing the electronic map.

In operation 505, the electronic device 210 may identify whether a potential vehicle appearance is included in the called image. For example, the electronic device 210 may identify whether a potential vehicle appearance is included in the image in response to calling the image. In response to identifying that a potential vehicle appearance is included in the image, the electronic device 210 may execute operation 507, otherwise may execute operation 503 again.

In operation 507, the electronic device 210 may obtain the called image as the first image in response to identifying that a potential vehicle appearance is included in the image. In other words, the electronic device 210 may obtain the called image as the first image obtained in operation 301 of FIG. 3.

Meanwhile, although not illustrated in FIG. 5, according to embodiments, in operation 505, the electronic device 210 may change the orientation of the road view provided by the called image based on identifying that the potential vehicle appearance is not included in the called image. For example, the application providing an image including the road view may include a function for changing orientation of the road view. For example, the function of changing the orientation of the road view may mean a function of changing a scene provided by the road view at a fixed position.

In various embodiments, the electronic device 210 may change the orientation of the road view by executing the function without user input using the application and identify whether a potential vehicle appearance is comprised included in the image including the road view having the changed orientation. The electronic device 210 may obtain the image including the road view having the changed orientation as the first image based on identifying that a potential vehicle appearance is included in the image including the road view having the changed orientation. Meanwhile, the electronic device 210 may execute operation 503 based on identifying that a potential vehicle appearance is not included in the image including the road view having the changed orientation.

As described above, the electronic device 210 according to various embodiments may obtain the first image for configuring a data set for training the computer vision model 225 from an image including a road view provided to enhance convenience of electronic maps. Since the obtaining of the first image is executed without a user input, the electronic device 210 according to various embodiments may enhance convenience for obtaining the first image.

Figure 6:
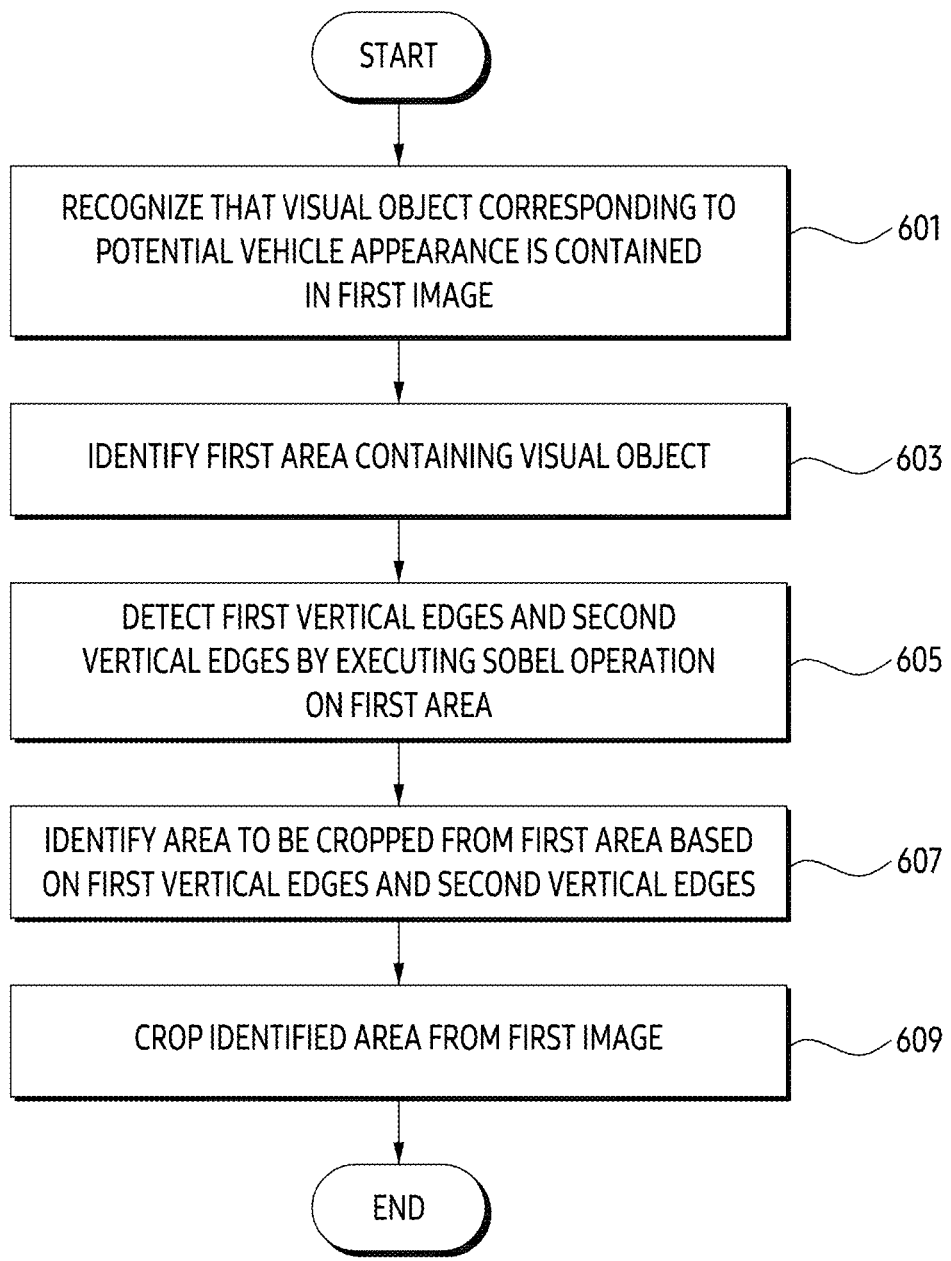
FIG. 6 is a flowchart illustrating a method of cropping an area including a visual object corresponding to a potential vehicle appearance from a first image according to various embodiments.

FIG. 6 is a flowchart illustrating a method of cropping an area including a visual object corresponding to a potential vehicle appearance from a first image according to various embodiments. This method may be executed by the electronic device 210 illustrated in FIG. 2 or a processor of the electronic device 210.

Operations 601 to 609 of FIG. 6 may be related to operation 303 of FIG. 3.

Figure 7:
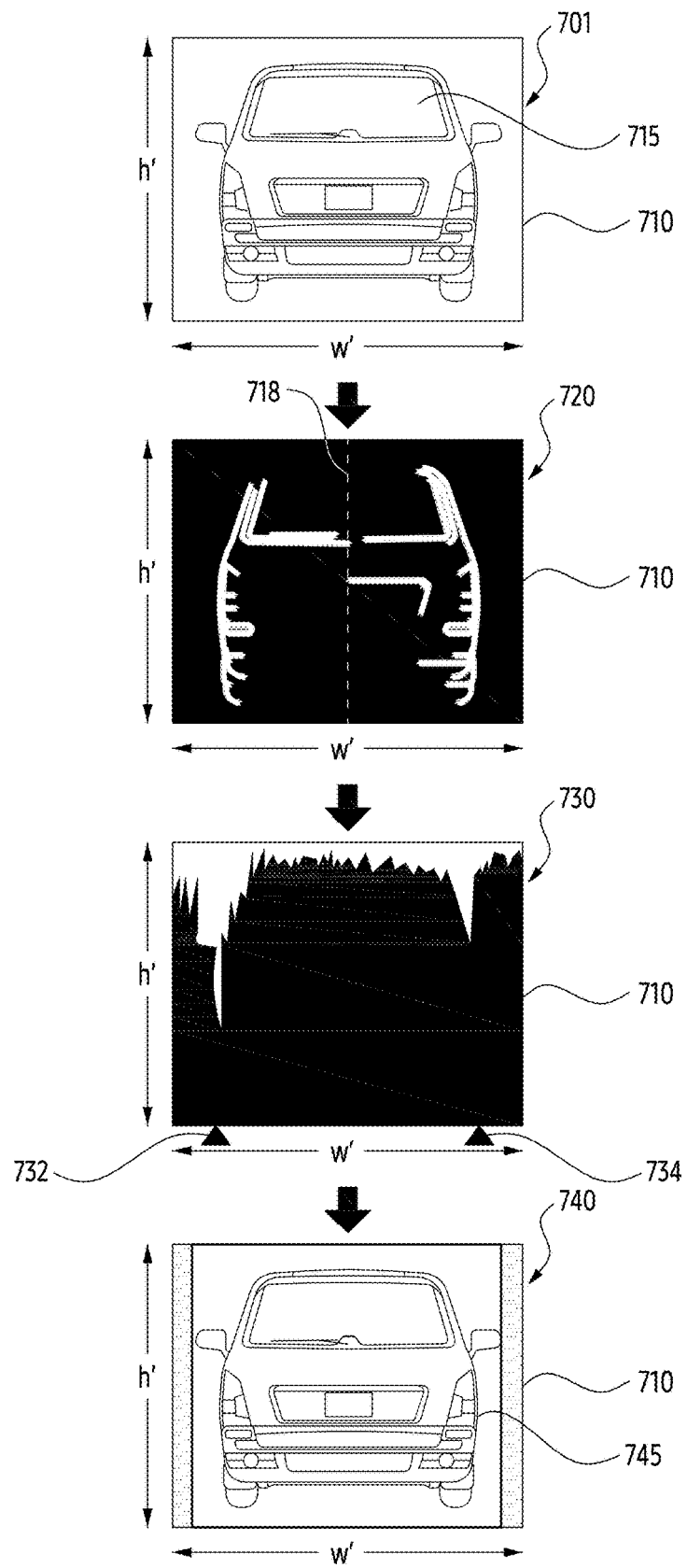
FIG. 7 illustrates an example of a method of cropping an area including a visual object corresponding to a potential vehicle appearance from a first image according to various embodiments.
Figure 8A:
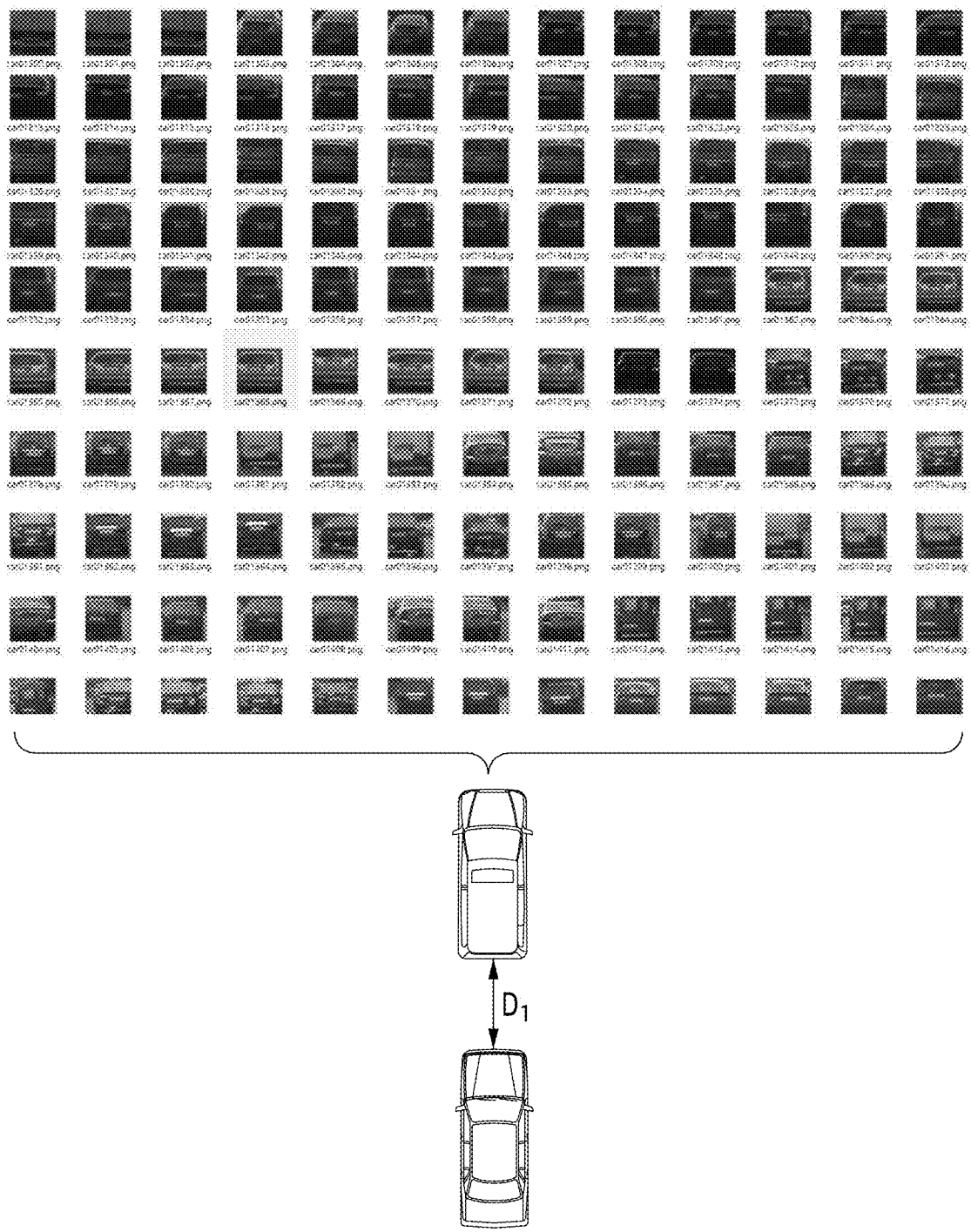
FIGS. 8A to 8D illustrate examples of cropped images from a first image according to various embodiments.
Figure 8B:
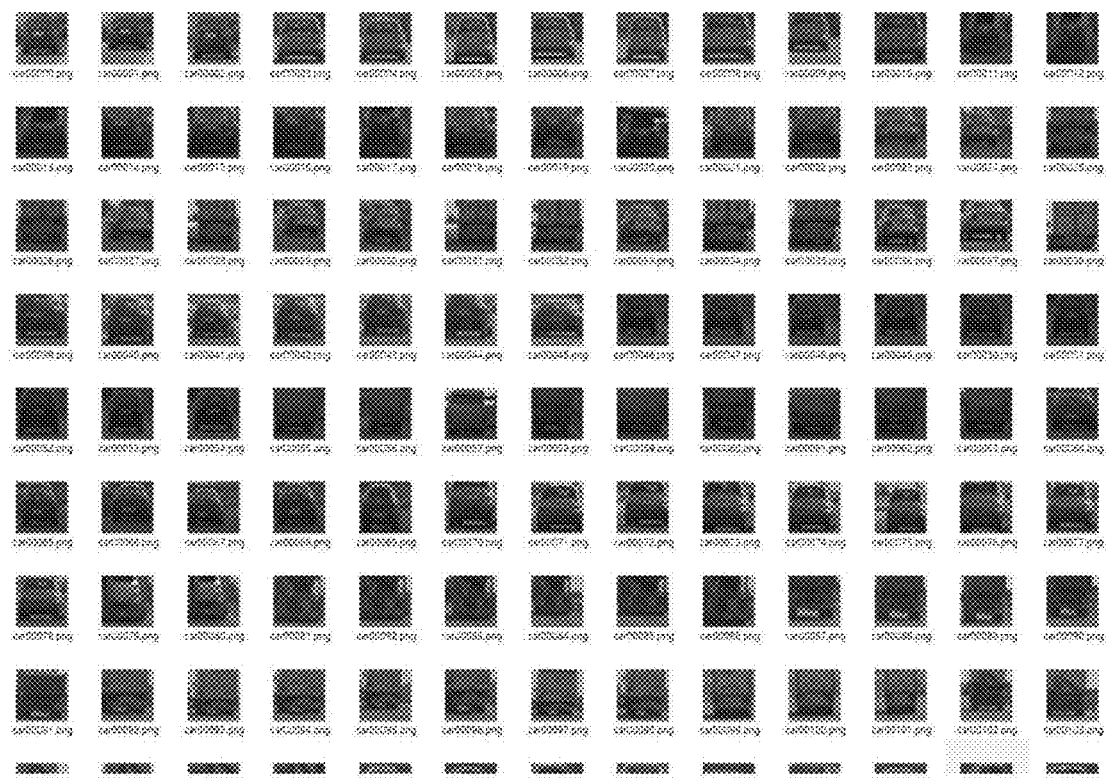
Figure 8B:
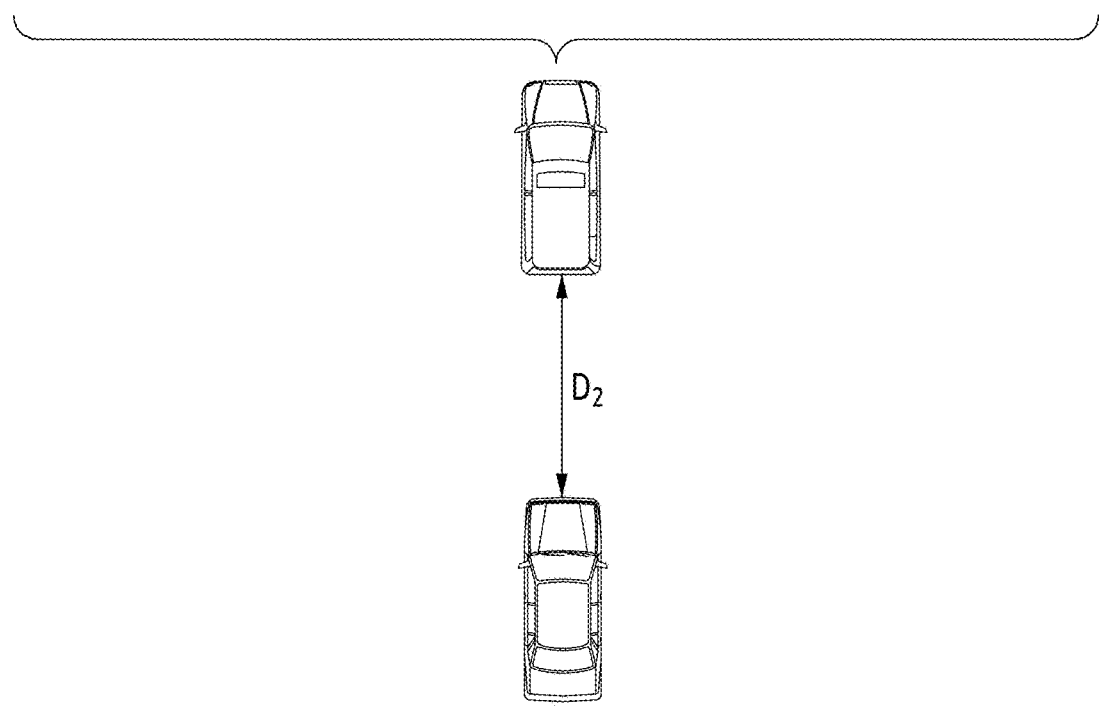
Figure 8C:
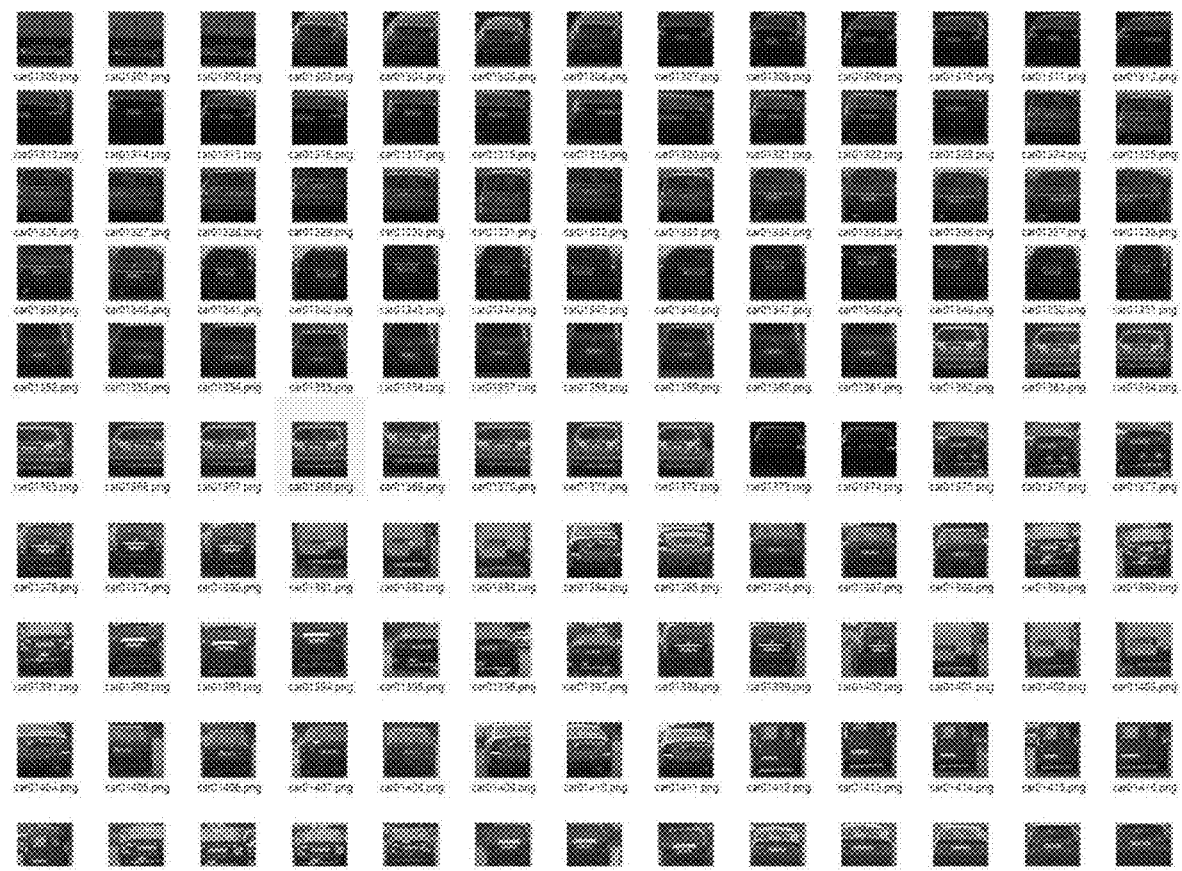
Figure 8C:
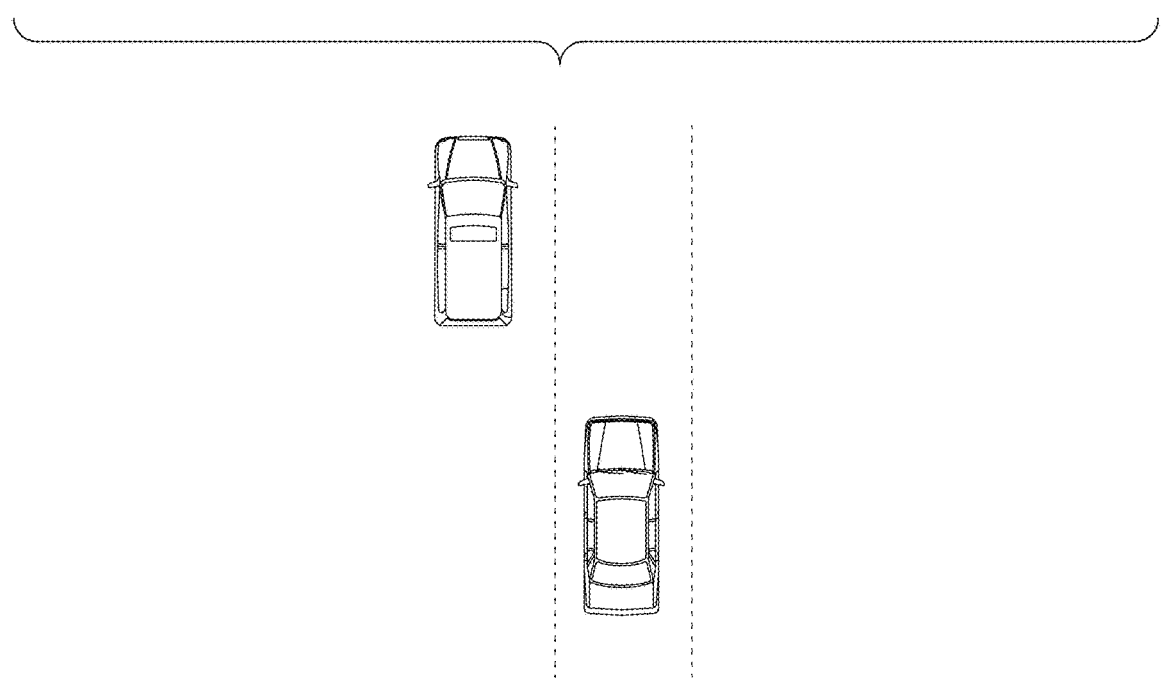
Figure 8D:
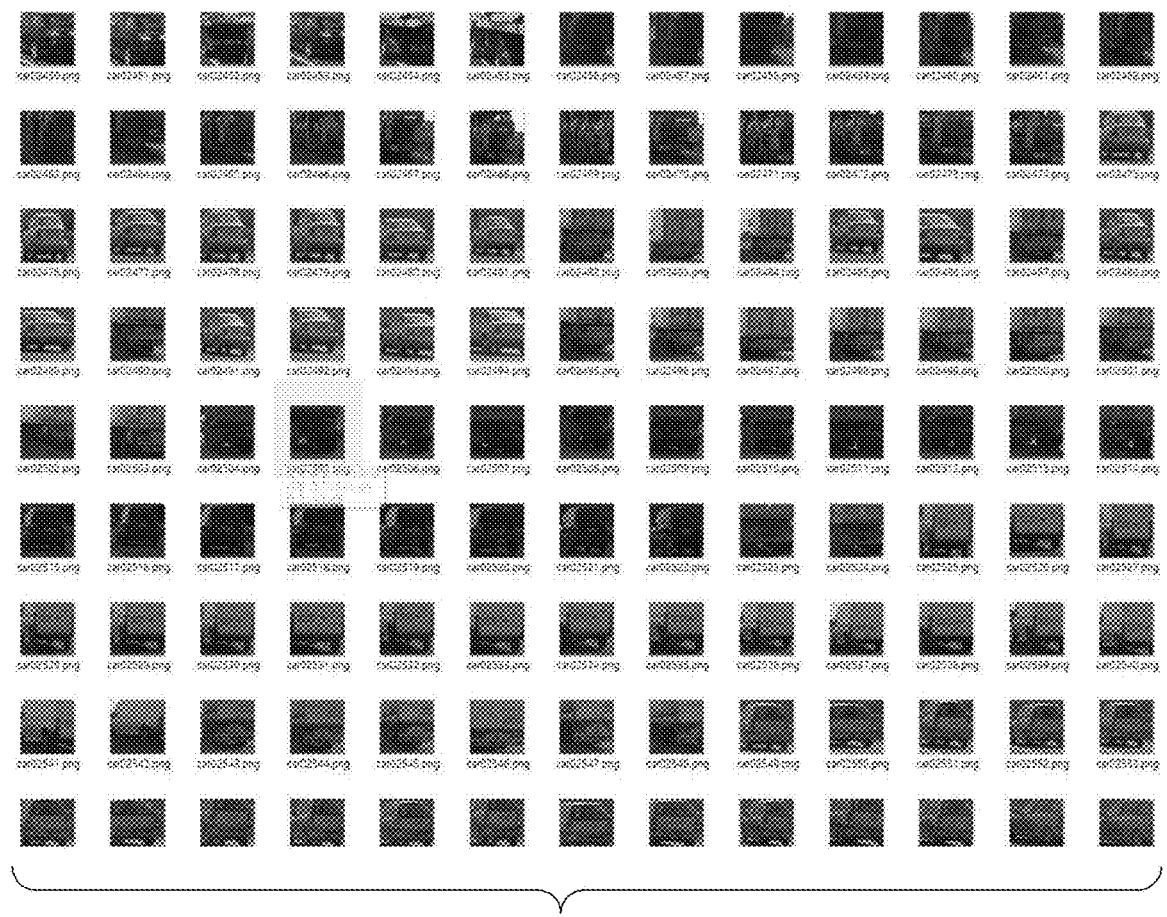
Figure 8D:
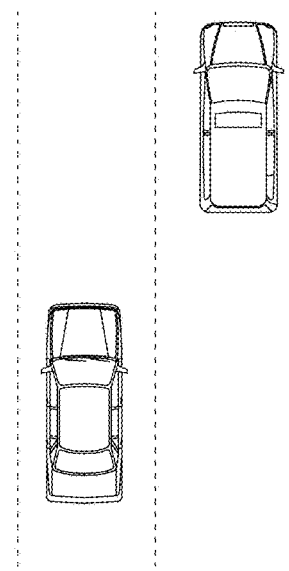

FIG. 7 illustrates an example of a method of cropping an area including a visual object corresponding to a potential vehicle appearance from a first image according to various embodiments.

FIGS. 8A to 8D illustrate examples of images cropped from a first image according to various embodiments.

Referring to FIG. 6, in operation 601, the electronic device 210 may recognize that a visual object corresponding to a potential vehicle appearance is comprised in the first image. For example, the electronic device 210 may recognize that the visual object corresponding to the potential vehicle appearance is included in the first image based on the analysis of the first image.

In operation 603, the electronic device 210 may identify a first area including the visual object based on the recognition. For example, the width of the first area may be wider than the area described through the description of operation 303 of FIG. 3 For example, the height of the first area may be longer than the area described through the description of operation 303 of FIG. 3. FIGS. 6 and 7 illustrate an example in which only the width of the first area is wider than that of the area described through the description of operation 303 of FIG. 3, but this is for convenience of description. For example, the method to be described through the description of FIGS. 6 and 7 may also be applied to the height of the area.

For example, referring to FIG. 7, in operation 603, the electronic device 210 may identify the first area 710 from the first image like state 701. In state 710, the first area 710 may comprise a visual object 715 corresponding to a potential vehicle appearance. The visual object 715 may show a rear of a vehicle including at least one tail lamp.

In operation 605, the electronic device 210 may detect first vertical edges with respect to a left part of the first area based on a vertical center line of the first area, and second vertical edges with respect to a right part of the first area based on a vertical center line of the first area by executing Sobel operation on the first area. For example, referring to FIG. 7, the electronic device 210, as in state 720, may detect first vertical edges with respect to the left part of the first area 710 based on the vertical center line 718 of the first area 710, and second vertical edges with respect to the right part of the first area 710 based on the vertical center line 718 of the first area 710.

In operation 607, the electronic device 210 may identify an area to be crop from the first area based on the first vertical edges and the second vertical edges. For example, the electronic device 210 may identify from the first area an area having a portion corresponding to the maximum value among the vertical histogram accumulation values for the first vertical edges as a left boundary and a portion corresponding to the maximum value among the vertical histogram accumulation values for the second vertical edges as a right boundary. For example, referring to FIG. 7, the electronic device 210, as in state 730, may identify from the first area 710 an area having a portion corresponding to the maximum value 732 among the vertical histogram accumulation values for the first vertical edges as a left boundary and a portion corresponding to a maximum value 734 among the vertical histogram accumulation values for the second vertical edges as a right boundary.

In operation 609, the electronic device 210 may crop the identified area from the first image. For example, referring to FIG. 7, the electronic device 210, as in state 740, may crop an area 745 having a part corresponding to the maximum value 732 as a left boundary and a part corresponding to the maximum value 734 as a right boundary from the first image.

In various embodiments, in operation 609, the area cropped from the first image may be variously classified according to a positional relationship between the camera and the subject. For example, referring to FIG. 8A, the area may be classified into a set 800 of images including a visual object in a state in which the distance between the camera and the subject (rear of a vehicle) is less than a predetermined distance. For another example, referring to FIG. 8B, the area may be classified into a set 810 of images including a visual object in a state in which the distance between the camera and the subject is equal to or greater than the predetermined distance. For another example, referring to FIG. 8C, the area may be classified into a set 820 of images including a visual object corresponding to a subject (rear of a vehicle) positioned on the left side based on the optical axis of the camera. For another example, referring to FIG. 8D, the area may be classified into a set 830 of images including a visual object corresponding to a subject (rear of a vehicle) positioned on the right side based on the optical axis of the camera.

As described above, the electronic device 210 according to various embodiments may identify or crop an area composed of the visual object from the first image to enable computer vision model 225 to perform training based on visual objects corresponding to potential vehicle appearance. In addition, the electronic device 210 according to various embodiments may enhance the efficiency of training of the computer vision model 225 by classifying an image composed of the identified area according to a positional relationship between a subject and a camera corresponding to the visual object.

Figure 9:
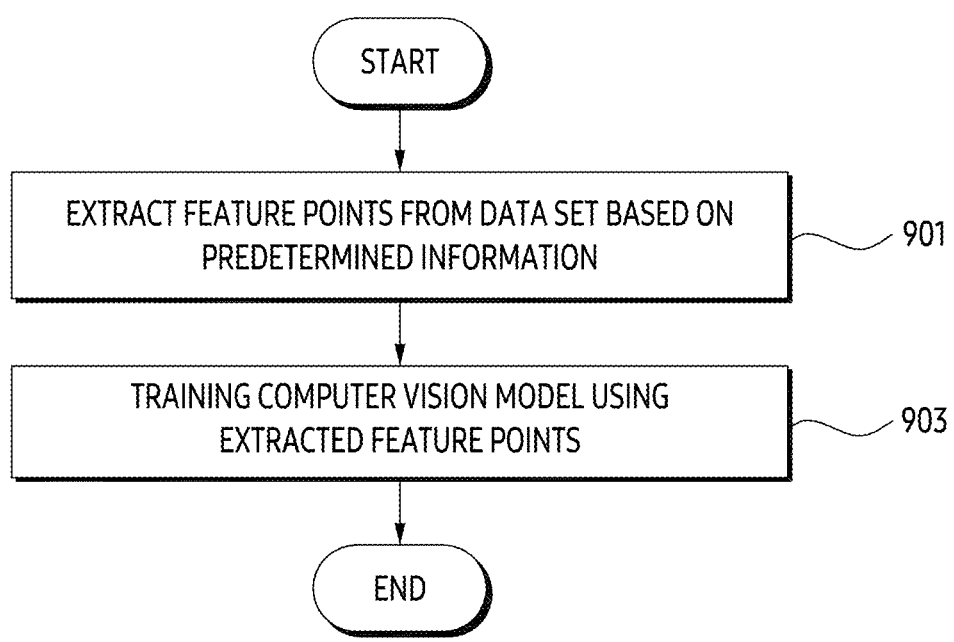
FIG. 9 is a flowchart illustrating a method of training a computer vision model according to various embodiments.

FIG. 9 is a flowchart illustrating a method of training a computer vision model according to various embodiments. This method may be executed by the electronic device 220 or the processor of the electronic device 220 illustrated in FIG. 2.

Referring to FIG. 9, in operation 901, the electronic device 220 may extract feature points from a data set based on predetermined information. For example, the data set may be a data set configured by the electronic device 210 and provided from the electronic device 210 to the electronic device 220. For example, the data set may be a data set defined through the description of FIGS. 3 to 8D. For example, the electronic device 220 may extract the feature points from an image (e.g., the second image) in the data set.

In various embodiments, the predetermined information is information used to extract the feature points, and may comprise grayscale intensity and RGB (red, green, blue) color information, HSV (hue, saturation, value) color information, YIQ color information, edge information (grayscale, binary, eroded binary) and etc.

In operation 903, the electronic device 220 may train the computer vision model 225 using the extracted feature points. For example, the electronic device 220 may obtain a classifier for vehicle detection by performing classification for vehicle detection based on the extracted feature points and strengthening the classification through training of the computer vision model 225. The classifier may be provided to the electronic device 240.

As described above, the electronic device 220 according to various embodiments may train the computer vision model 225 using the data set obtained from the electronic device 210. The computer vision model 225 trained by the electronic device 220 may be used for vehicle detection by the electronic device 240 in the vehicle. In other words, the electronic device 220 according to various embodiments may assist in providing information on an environment around a driving vehicle by training the computer vision model 225.

Figure 10:
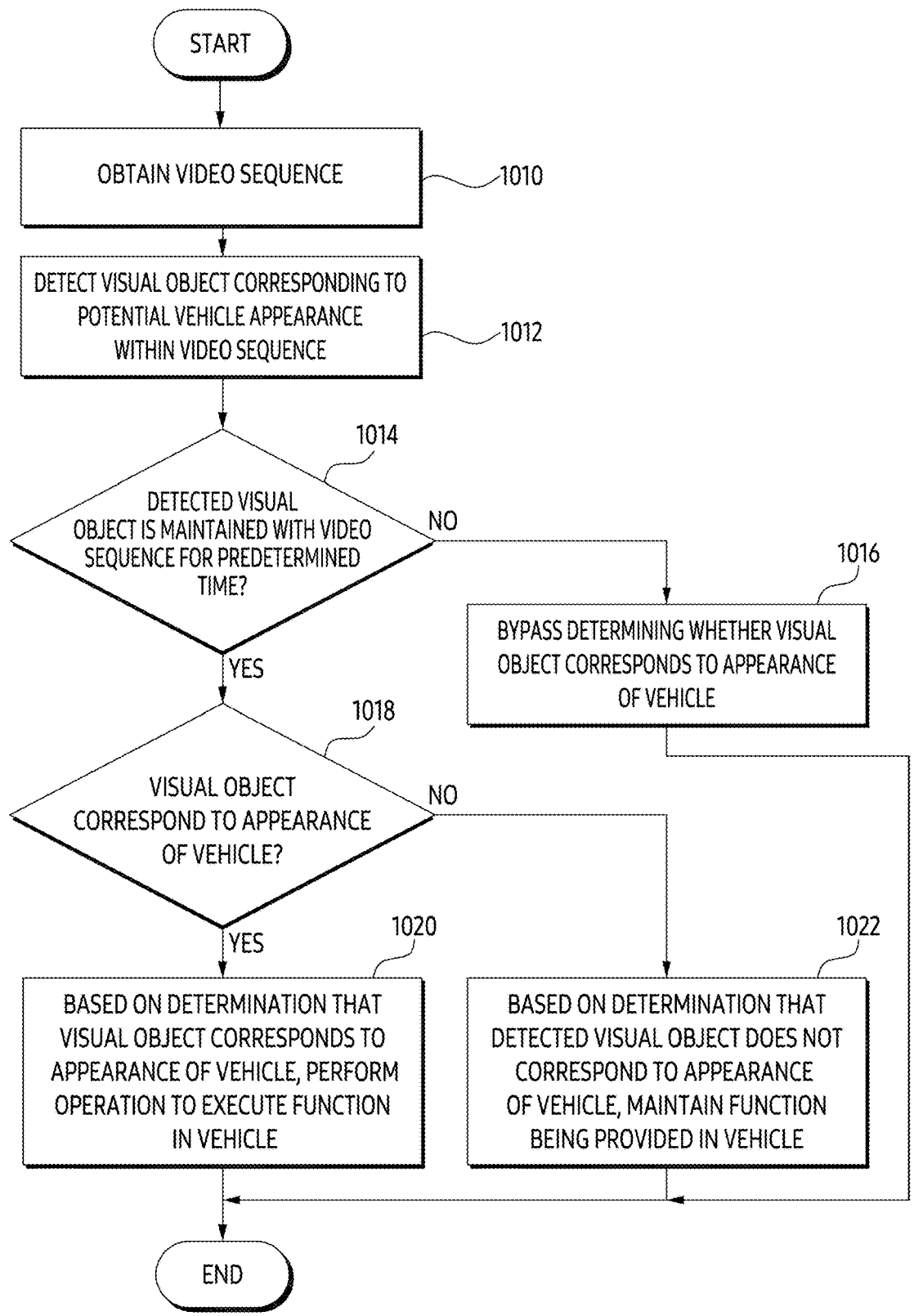
FIG. 10 is a flowchart illustrating a method of determining whether a visual object included in at least a part of a video sequence corresponds to a vehicle appearance using a computer vision model according to various embodiments.

FIG. 10 is a flowchart illustrating a method of determining whether a visual object included in at least a part of a video sequence corresponds to a vehicle appearance using a computer vision model according to various embodiments. This method may be executed by the processor of the electronic device 240 or the electronic device 240 illustrated in FIG. 2.

Referring to FIG. 10, in operation 1010, an electronic device 240 in a moving vehicle may obtain a video sequence through a camera related to the vehicle. For example, the camera may comprise a camera 227 illustrated in FIG. 2 as a camera disposed toward the front of the vehicle.

In various embodiments, the video sequence may be configured with a plurality of image frames. For example, the plurality of image frames may include a first image frame, a second image frame immediately after the first image frame, and a third image frame immediately after the second image frame.

In operation 1012, the electronic device 240 may detect a visual object corresponding to a potential vehicle appearance within the obtained video sequence. For example, in a state in which the computer vision model 225 is deactivated, the electronic device 240 may detect the visual object in the video sequence based on the analysis of the video sequence. For example, the electronic device 240 may detect the visual object by analyzing each of a plurality of image frames in the video sequence obtained live while the vehicle is moving. For example, the electronic device 240 may detect the visual object that was not detected in the first image frame in the second image frame.

In operation 1014, the electronic device 240 may identify whether the detected visual object is maintained in the video sequence for a predetermined time. For example, the electronic device 240 may identify whether the visual object is maintained in the video sequence for the predetermined time from a timing of detecting the visual object in the second image frame. For example, the electronic device 240 may identify whether the visual object is continuously present (or maintained) from the third image frame immediately after the second image frame to the Nth image frame (N is a natural number greater than or equal to 4, set according to the length of time predetermined). For example, since the visual object corresponding to the external object located around the vehicle and fixed to the ground may disappear from the video sequence before the predetermined time elapses due to the movement of the vehicle, the electronic device 240 may identify whether the visual object is maintained in the video sequence for the predetermined time. For another example, since a visual object corresponding to an external object moving at a speed significantly slower than the moving speed of the vehicle may be an object that is not required to be considered in the moving vehicle, the electronic device 240 may identify whether the visual object is maintained in the video sequence for the predetermined time.

Meanwhile, the predetermined time may be set to a fixed value or may be set to a value changed according to the moving speed of the vehicle.

Meanwhile, in various embodiments, when identifying that the detected visual object is maintained within the video sequence for the predetermined time, the electronic device 240 may execute operation 1018, otherwise execute operation 1016.

In operation 1016, the electronic device 240 may bypass determining using computer vision model 225 whether the visual object corresponds to the vehicle appearance based on identifying that the detected visual object is not maintained for the predetermined time in the video sequence.

The electronic device 240 according to various embodiments may enhance the efficiency of using the computer vision model 225 through operation 1016. For example, the reliability of vehicle detection using computer vision model 225 may be higher than the reliability of vehicle detection executed without using computer vision model 225, but a computational amount of vehicle detection using the computer vision model 225 may be greater than a computational amount of vehicle detection executed without using the computer vision model 225 in operation 1012. In consideration of this, the electronic device 240 may execute operation 1016 to reduce the load of the electronic device 240 or the load of the computer vision model 225.

In operation 1018, the electronic device 240, based on identifying that the visual object is maintained for the predetermined time in the video sequence, may determine whether the visual object maintained in the video sequence for the predetermined time corresponds to the vehicle appearance using the computer vision model 225. For example, the electronic device 240 may activate deactivated computer vision model 225 based on identifying that the visual object is maintained for the predetermined time in the video sequence, determine whether the visual object corresponds to the vehicle appearance using the activated computer vision model 225. For example, the electronic device 240 may provide information obtained based on at least a part of the video sequence including the visual object to the activated computer vision model 225, determine whether the visual object corresponds to the vehicle appearance using the computer vision model 225 obtained the information. When determining that the visual object corresponds to the vehicle appearance using the computer vision model 225, the electronic device 240 may execute operation 1020, otherwise may execute operation 1022.

In operation 1020, the electronic device 240 may perform an operation for executing a function in the vehicle based on a determination that the visual object corresponds to the vehicle appearance. In various embodiments, the function executed in operation 1020 may be a function required to be executed in the vehicle including electronic device 240 in relation to another vehicle corresponding to the visual object. For example, when the vehicle is moving based on autonomous driving, the function may be to reduce the speed of the vehicle based on a distance between the vehicle and another vehicle. For another example, when information on the environment around the moving vehicle is provided, the function may be to change or add the information according to the appearance of the other vehicle. However, it is not limited thereto.

In operation 1022, the electronic device 240 may maintain a function provided in the vehicle based on determining that the visual object does not correspond to the vehicle appearance or that the visual object is different from the vehicle appearance. For example, the electronic device 240 may prevent execution of the functions described in operation 1020, which is executed on the premise that another vehicle is present around the moving vehicle, and maintain the functions provided in the vehicle.

As described above, the electronic device 240 according to various embodiments may reduce the computational amount for vehicle detection by determining the use of the computer vision model 225 according to whether the visual object is maintained for a predetermined time. In addition, the electronic device 240 according to various embodiments may provide a service having high reliability through vehicle detection performed without the use of the computer vision model 225, identification of whether the visual object is maintained in a video sequence for a predetermined time, and vehicle detection through use of computer vision model 225.

Figure 11A:
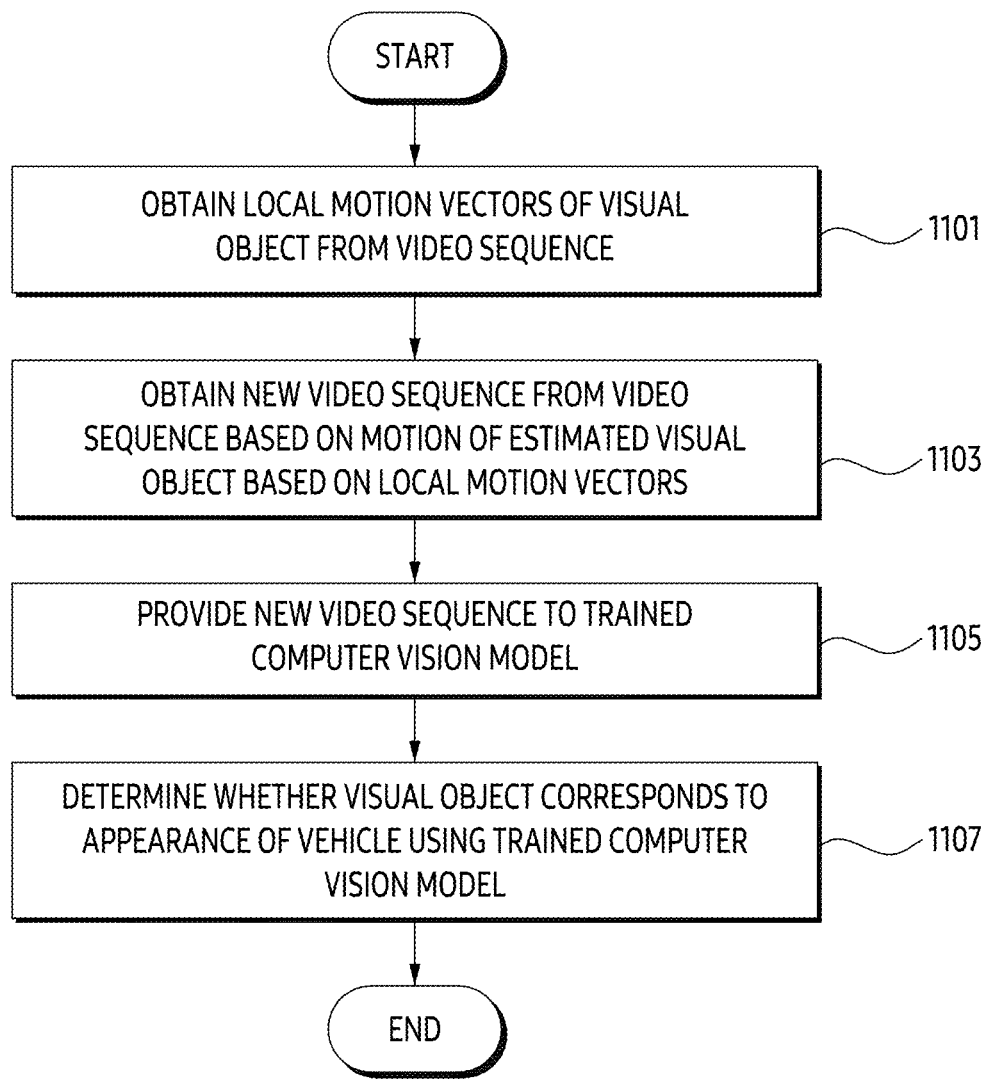
FIG. 11A is a flowchart illustrating a method of determining whether a visual object corresponds to a vehicle appearance based on a new video sequence converted from a video sequence according to various embodiments.

FIG. 11A is a flowchart illustrating a method of determining whether a visual object corresponds to a vehicle appearance based on a new video sequence converted from a video sequence according to various embodiments. This method may be executed by the electronic device 240 illustrated in FIG. 2 or the processor of the electronic device 240.

Operations 1101 to 1107 of FIG. 11A may be related to operations 1018 of FIG. 10.

Figure 11B:
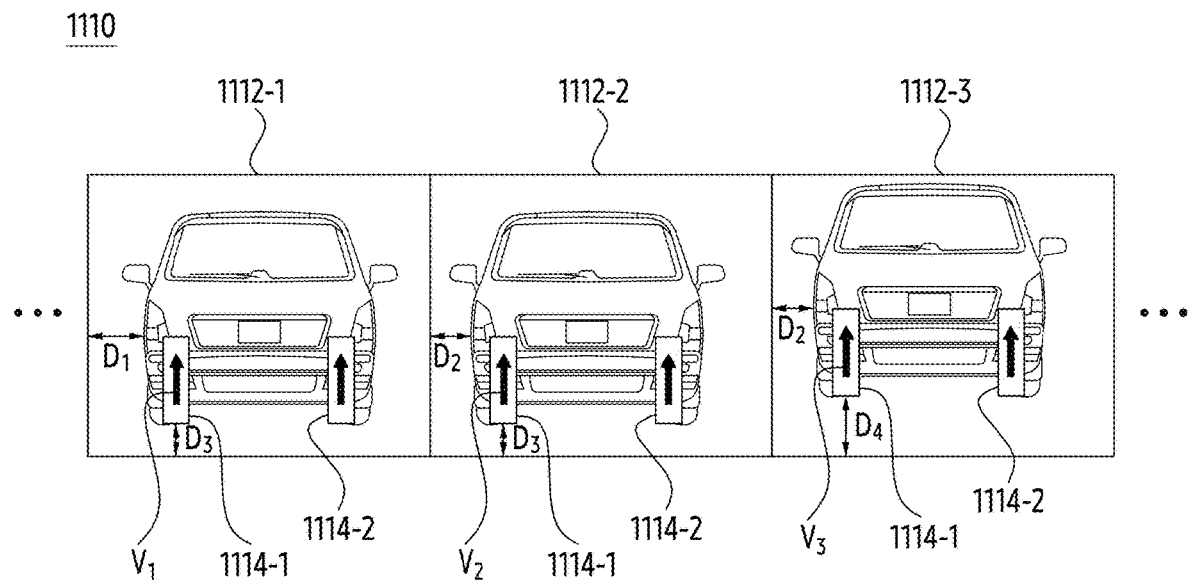
FIG. 11B illustrates an example of a new video sequence converted from a video sequence according to various embodiments.
Figure 11B:
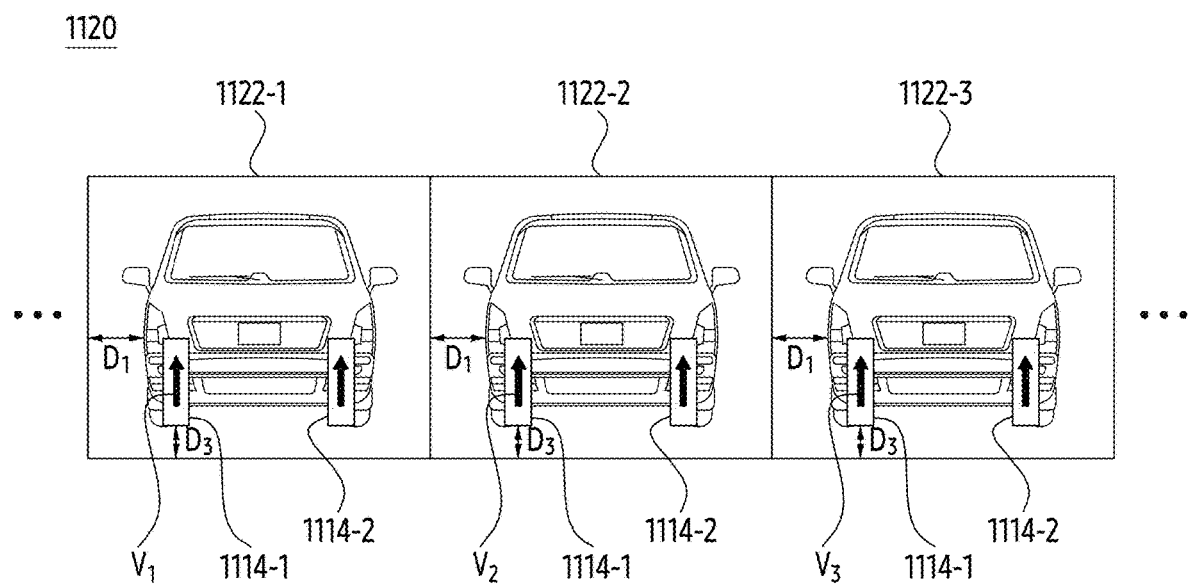

FIG. 11B illustrates an example of a new video sequence converted from a video sequence according to various embodiments.

Referring to FIG. 11A, in operation 1101, the electronic device 240 may obtain local movement vectors of a visual object corresponding to a potential vehicle appearance from a video sequence. For example, the local movement vectors of the visual object may be vectors for indicating movement of a predetermined portion of the visual object. For example, the predetermined portion of the visual object may be a portion corresponding to a wheel (or tire) of a vehicle in which movement frequently occurs. For example, referring to FIG. 11B, in image frames 1112-1 to 1112-3 in a portion 1110 of a video sequence, a predetermined portion of the visual object may be a portion 1114-1 corresponding to a first wheel of a vehicle and a portion 1114-2 corresponding to a second wheel of the vehicle. The electronic device 240 may obtain first local movement vectors for indicating movement of the portion 1114-1 and the portion 1114-2 from the image frame 1112-1 in a portion 1110 of the video sequence, second local movement vectors for indicating movement of portion 1114-1 and portion 1114-2 from image frame 1112-2 in portion 1110 of the video sequence, and third local movement vectors for indicating the movement of the portion 1114-1 and the portion 1114-2 from the image frame 1112-3 in a portion 1110 of the video sequence.

In operation 1103, the electronic device 240 may obtain a new video sequence from the video sequence based on the movement of the visual object estimated based on the obtained local movement vectors. For example, referring to FIG. 11B, the electronic device 240 may obtain global movement vectors of the visual object based on the first local movement vectors, the second local movement vectors, and the third local movement vectors, estimate the global movement of the visual object based on the global movement vectors, and obtain some 1120 of a new video sequence from some 1110 of the video sequence based on the estimated global movement.

For example, while the camera obtains a video sequence, the posture of the camera (e.g., camera 227) may be changed according to the movement of the vehicle including the electronic device 240. Since the change in the posture of the camera is reflected in the video sequence, the movement of the visual object in the video sequence may include not only the movement of the subject corresponding to the visual object but also a change in the posture of the camera. For example, even when a subject corresponding to the visual object moves in a direction away from the camera without vertical or horizontal movement while obtaining a part 1110 of the video sequence, the visual object may be expressed in some 1110 of the video sequence as being moved up and down or left and right by changing the posture of the camera. For example, even when the left and right movements of the subject do not exist during the time interval corresponding to the image frame 1112-1 and the image frame 1112-2, the visual object may be spaced apart from the left periphery by D1 in the image frame 1112-1 and by D2 from the left periphery in the image frame 1112-2 due to the change in the posture of the camera. For another example, even when the left and right movements of the subject do not exist during the time interval corresponding to the image frame 1112-2 and the image frame 1112-3, the visual object may be spaced apart from the left periphery by D3 in the image frame 1112-2 and by D4 from the left periphery in the image frame 1112-3 due to the change in the posture of the camera.

To prevent the movement of the visual object from being misrecognized by the change of the posture of the camera, the electronic device 240 according to various embodiments may obtain global movement vectors of the visual object based on local movement vectors of the visual object in part 1110 of the video sequence, obtain a portion 1120 of a new video sequence in which the movement of the camera is compensated based on the global movement vectors. For example, the visual object in image frame 1122-2 in some 1120 of a new video sequence may be spaced apart from the left periphery by D1 as in image frame 1122-1. For another example, the visual object in image frame 1122-3 in some 1120 of a new video sequence may be spaced apart from the bottom periphery by D3 as in image frame 1122-2. In other words, some 1120 of the new video sequence converted from some 1110 of the video sequence may comprise a visual object corresponding to a subject moving away from the camera, without vertical movement or left-right movement.

In operation 1105, the electronic device 240 may provide the obtained new video sequence to trained computer vision model 225.

In operation 1107, the electronic device 240 may determine whether the visual object detected in the video sequence corresponds to the vehicle appearance using a trained computer vision model 225 obtained the new video sequence.

As described above, in order to determine whether the visual object in the video sequence corresponds to the vehicle appearance, the electronic device 240 according to various embodiments may convert a video sequence reflecting a change in the posture of a camera into a new video sequence compensating for the change in the posture of the camera and provide the new video sequence to a trained computer vision model 225. The electronic device 240 according to various embodiments may enhance the reliability of the determination through such an operation.

Figure 12A:
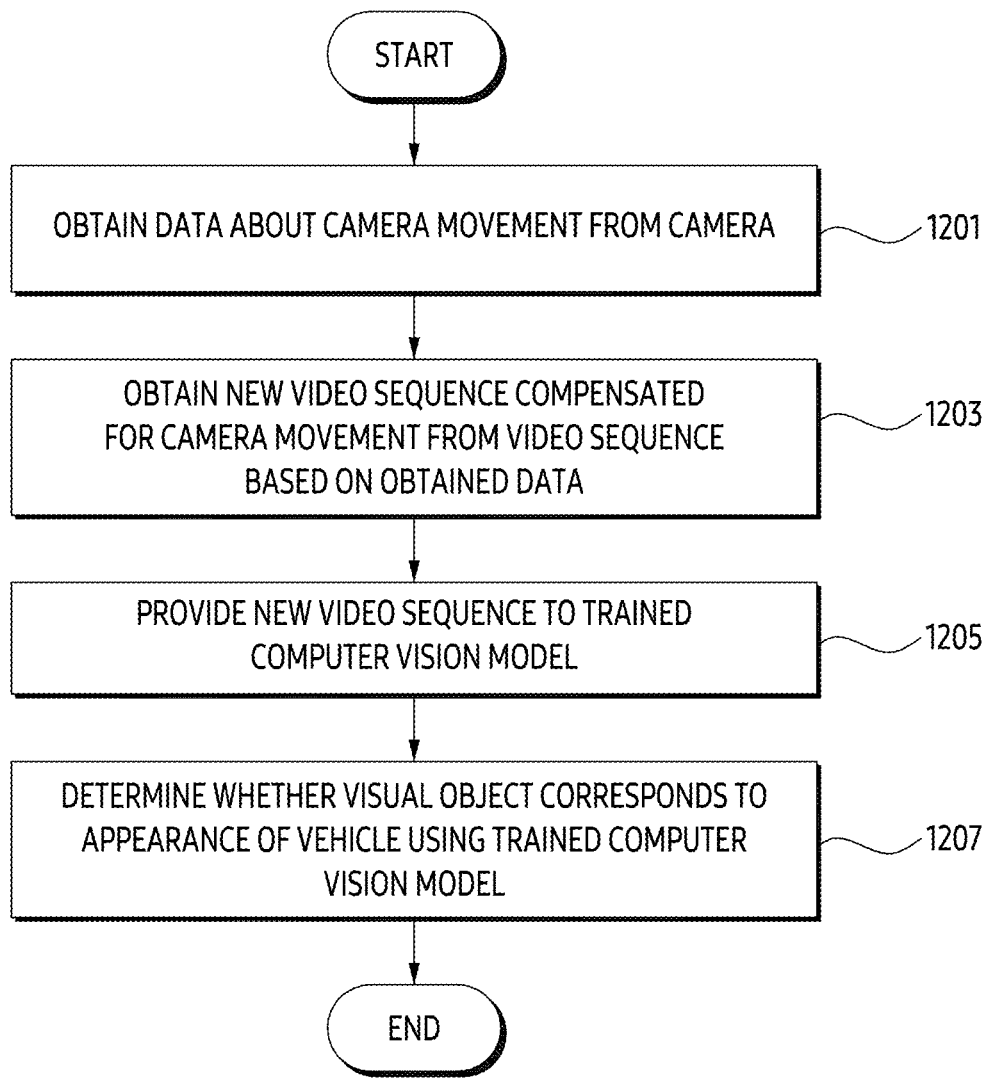
FIG. 12A is a flowchart illustrating another method of determining whether a visual object corresponds to a vehicle appearance based on a new video sequence converted from a video sequence according to various embodiments.

FIG. 12A is a flowchart illustrating another method of determining whether a visual object corresponds to a vehicle appearance based on a new video sequence converted from a video sequence according to various embodiments. This method may be executed by the electronic device 240 illustrated in FIG. 2 or the processor of the electronic device 240.

Operations 1201 to 1207 of FIG. 12A may be related to operations 1018 of FIG. 10.

Figure 12B:
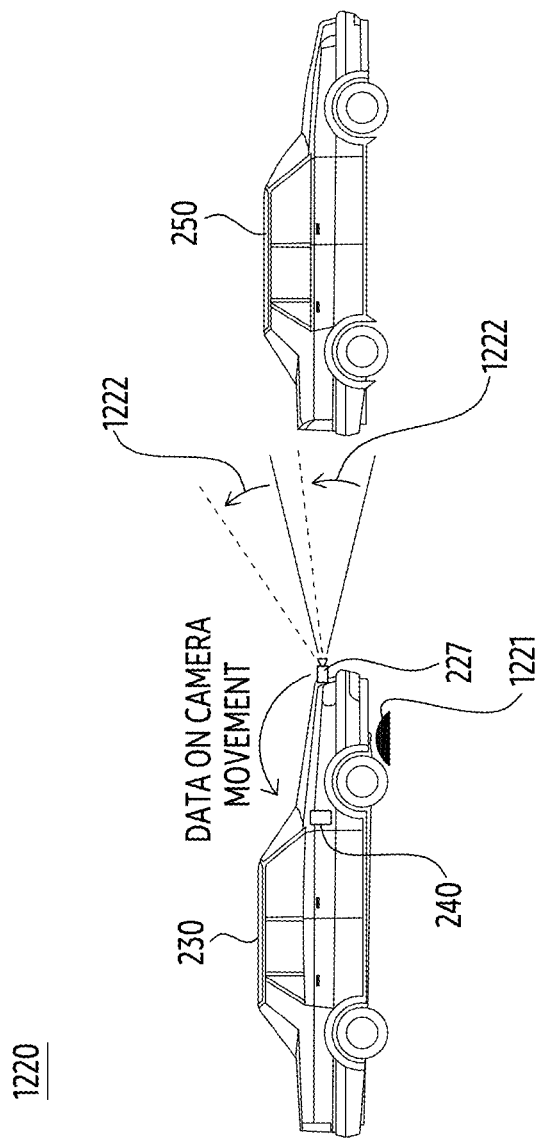
FIG. 12B illustrates another example of a new video sequence converted from a video sequence according to various embodiments.

FIG. 12B illustrates another example of a new video sequence converted from a video sequence according to various embodiments.

Referring to FIG. 12A, in operation 1201, the electronic device 240 may obtain data on the movement of the camera from a camera that has obtained a video sequence. For example, the electronic device 240 may obtain data on at least one of the left and right movements of the camera or the vertical movement of the camera while obtaining the video sequence. For example, referring to FIG. 12B, as in state 1220, movement 1222 may be caused in camera 227 during obtainment of the video sequence due to the movement of vehicle 230 passing through the speed bump 1221. Although the vehicle 250 moves in a direction away from the camera 227 without vertical movement, the visual object in the video sequence corresponding to the vehicle 250 may move up and down due to movement 1222 of the camera 227. The electronic device 240 according to various embodiments may obtain data on movement 1222 of the camera 227 to compensate for the vertical movement of the visual object.

FIG. 12A illustrates an example of obtaining data on the movement of the camera from the camera, but this is for convenience of description. Instead of obtaining data on the movement of the camera from the camera, the electronic device 240 may obtain data on the movement of the vehicle 230.

In operation 1203, the electronic device 240 may obtain a new video sequence in which the movement of the camera is compensated from the video sequence based on the obtained data. Unlike the video sequence, the new video sequence may comprise only the movement of the visual object.

In operation 1205, the electronic device 240 may provide the new video sequence to the trained computer vision model 225.

In operation 1207, the electronic device 240 may determine whether the visual object detected in the video sequence corresponds to the vehicle appearance using a trained computer vision model 225 obtained the new video sequence.

As described above, in order to determine whether the visual object in the video sequence corresponds to the appearance of the vehicle, the electronic device 240 according to various embodiments may convert a video sequence reflecting the movement of the camera into a new video sequence compensating for the movement of the camera and provide the new video sequence to trained computer vision model 225. The electronic device 240 according to various embodiments may enhance the reliability of the determination through such an operation.

Figure 13A:
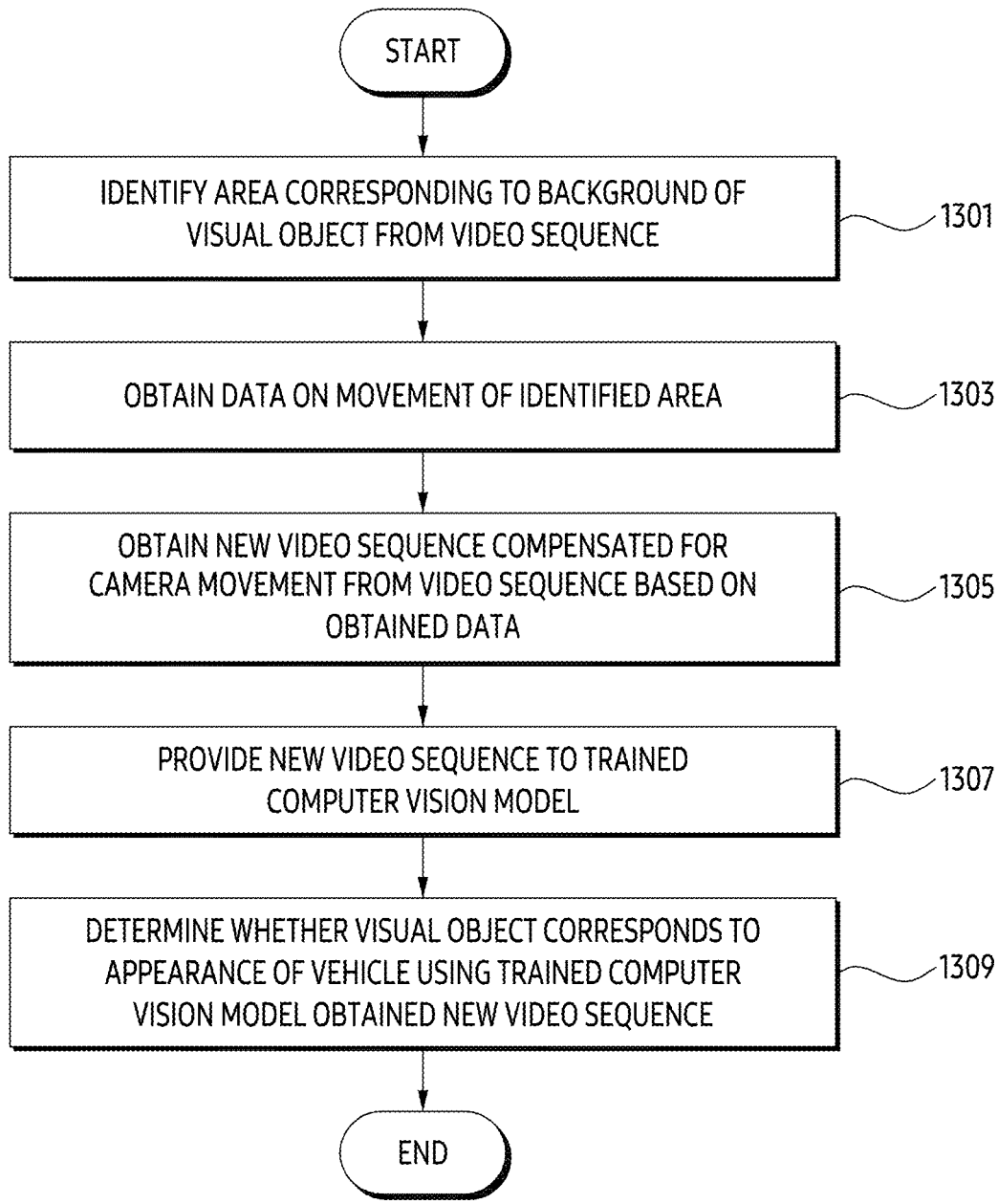
FIG. 13A is a flowchart illustrating another method of determining whether a visual object corresponds to a vehicle appearance based on a new video sequence converted from a video sequence according to various embodiments.

FIG. 13A is a flowchart illustrating another method of determining whether a visual object corresponds to a vehicle appearance based on a new video sequence converted from a video sequence according to various embodiments. This method may be executed by the processor of the electronic device 240 or the electronic device 240 illustrated in FIG. 2.

Operations 1301 to 1309 of FIG. 13A may be related to operations 1018 of FIG. 10.

Figure 13B:
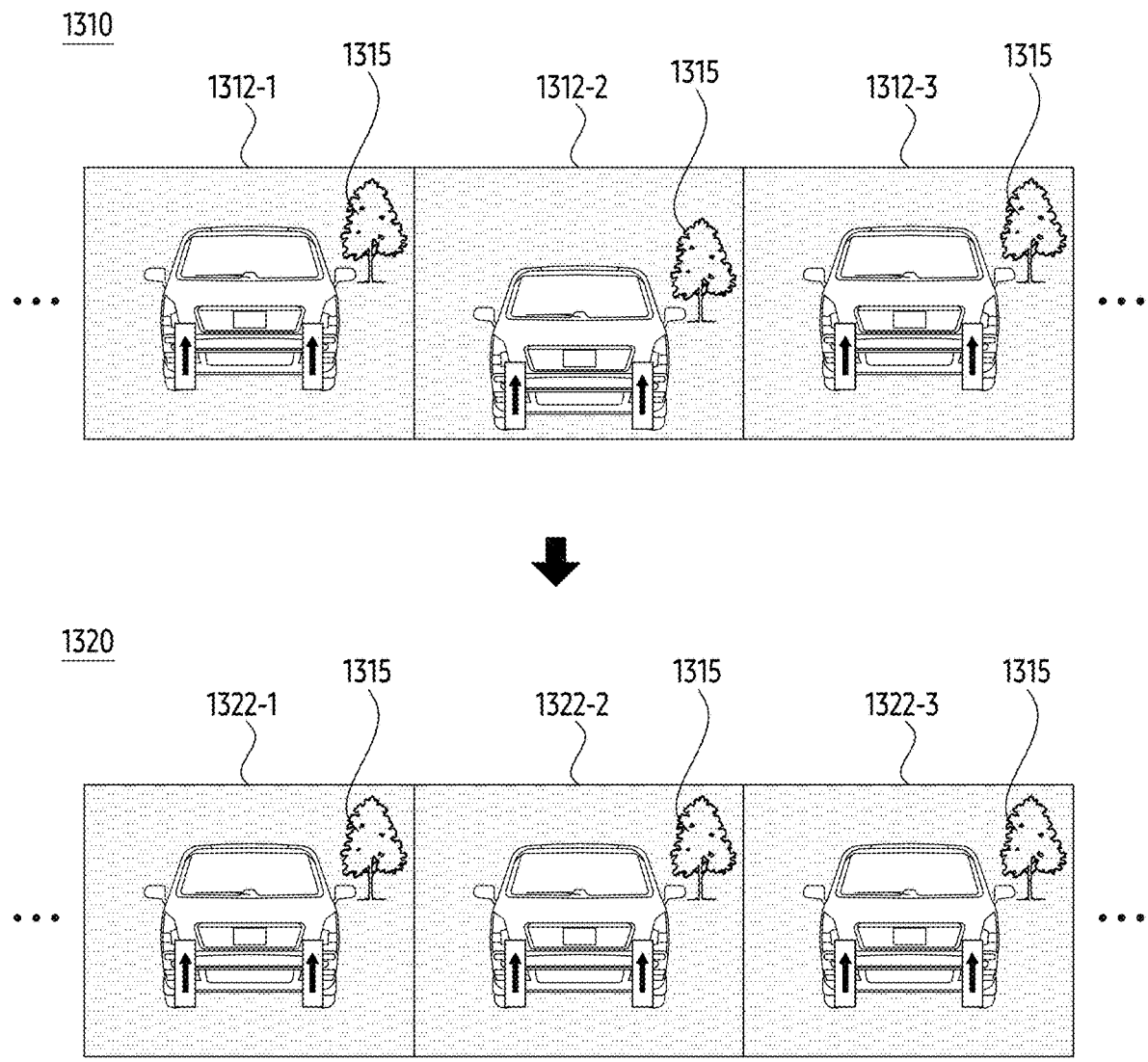
FIG. 13B illustrates another example of a new video sequence converted from a video sequence according to various embodiments.

FIG. 13B illustrates another example of a new video sequence converted from a video sequence according to various embodiments.

Referring to FIG. 13A, in operation 1301, the electronic device 240 may identify an area corresponding to a background of a visual object from the video sequence. For example, the electronic device 240 may identify an area corresponding to the background excluding the visual object from each of a plurality of image frames in the video sequence. For example, referring to FIG. 13B, the electronic device 240 may identify areas 1314-1 to 1314-3 corresponding to the background of the visual object in image frames 1312-1 to 1312-3 within a portion 1310 of the video sequence, respectively.

In operation 1303, the electronic device 240 may obtain data on the movement of the identified area. For example, referring to FIG. 13B, area 1314-1, area 1314-2, and area 1314-3 may include visual object 1315 corresponding to a fixed subject distinguished from the visual object at different locations due to the movement of the camera caused while obtaining portion of the video sequence 1310. The electronic device 240 may obtain data on the movement of the area 1314-1, the area 1314-2, and the area 1314-3 based on the movement of the visual object 1315. The obtained data may correspond to data on the movement of the camera obtaining part of a video sequence 1310.

In operation 1305, the electronic device 240 may obtain a new video sequence in which the movement of the camera is compensated from the video sequence based on the obtained data. For example, referring to FIG. 13B, the electronic device 240 may obtain part of a new video sequence 1320 in which the movement of the camera is compensated from part of the video sequence 1310 based on the obtained data. Unlike visual object 1315 in image frame 1312-1 to image frame 1312-3 in part of the video sequence 1310, which has a variable position, the position of the visual object 1315 in the image frames 1322-1 to 1322-3 within a part of the new video sequence 1320 may be fixed.

In operation 1307, the electronic device 240 may provide the new video sequence to the trained computer vision model 225.

In operation 1309, the electronic device 240 may determine whether the visual object detected in the video sequence corresponds to the vehicle appearance using trained computer vision model 225 obtained the new video sequence.

As described above, in order to determine whether the visual object in the video sequence corresponds to the vehicle appearance, the electronic device 240 according to various embodiments may convert a video sequence reflecting a change in the posture of a camera into a new video sequence compensating for the change in the posture of the camera and provide the new video sequence to a trained computer vision model 225. The electronic device 240 according to various embodiments may enhance the reliability of the determination through such an operation.

Meanwhile, the electronic device 240 according to various embodiments may transmit information on the visual object (e.g., visual object 1315) corresponding to the fixed subject (e.g., infrastructure within the road, streetlights, speed bumps, highway toll gates, tunnels, median strips, street trees, traffic lights, crosswalks, bridges, overpasses, etc.) to the electronic device (e.g., server) related to the computer vision model 225 through the wireless communication circuit of the vehicle. For example, in order to transmit the information on the visual object, an OTA (over the air) technique may be used in the electronic device 240. In various embodiments, the information on the visual object corresponding to the fixed subject may be transmitted in connection with location information of the fixed subject. In various embodiments, the information on the visual object received by the electronic device related to computer vision model 225 may be stored in connection with location information of the fixed subject. The information on the visual object stored in the electronic device in connection with the location information may be used to update map information related to autonomous driving. For example, when the fixed subject is not included in the map information, the electronic device 240 may provide information on the visual object and location information of the fixed subject corresponding to the visual object to the electronic device; the electronic device may store information on the visual object in connection with the location information and update the map information by newly inserting information on the visual object stored in connection with the location information into the map information. In various embodiments, the updated map information may be used for another vehicle distinguished from the vehicle 230 including the electronic device 240. For example, when an image including the visual object is obtained through the camera related to the other vehicle after updating the map information, the electronic device related to the other vehicle may identify that the visual object in the image is the fixed subject, based on the updated map information, without an operation to recognize what the visual object is in the obtained image.

As described above, when a newly appeared visual object for fixed subject exists in the image obtained through camera 227, the electronic device related to the computer vision model 225 according to various embodiments may not only reduce the amount of computation for recognizing the visual object but also enhance the efficiency of resources related to autonomous driving by updating the map information based on transmission of information on the visual object.

Figure 14:
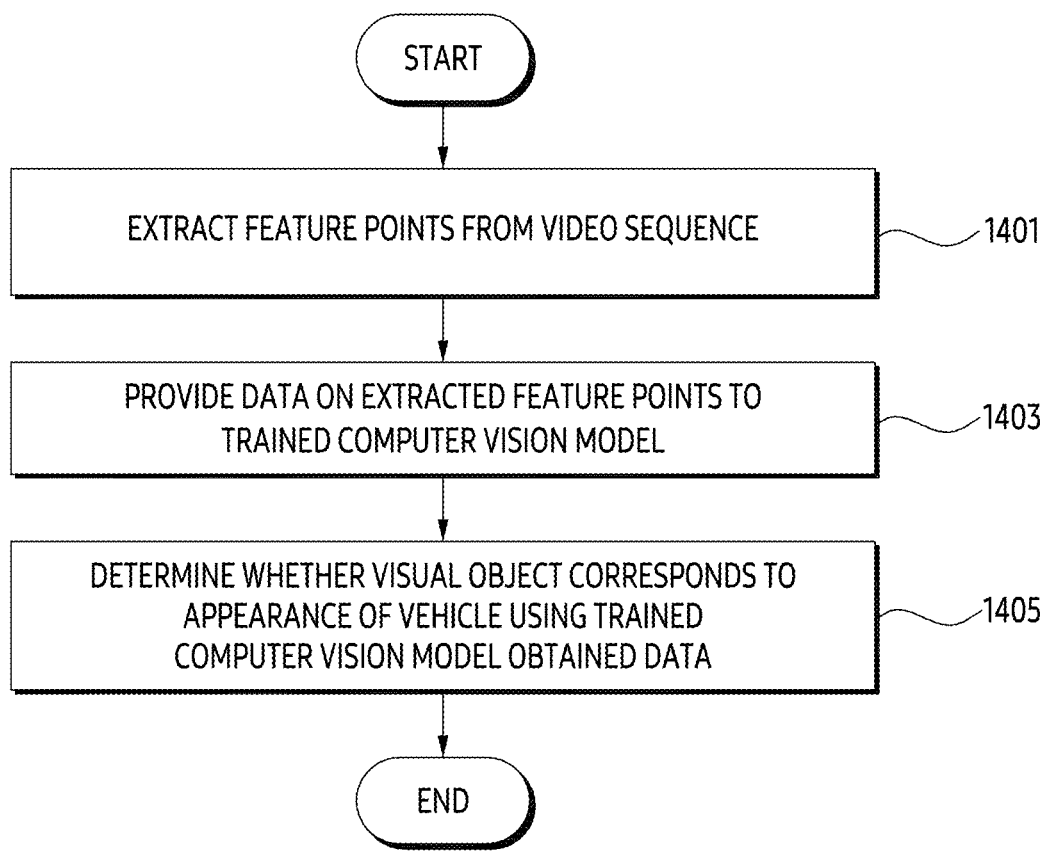
FIG. 14 is a flowchart illustrating a method of determining whether a visual object corresponds to a vehicle appearance based on data on feature points extracted according to various embodiments.

FIG. 14 is a flowchart illustrating a method of determining whether a visual object corresponds to a vehicle appearance based on data on feature points extracted according to various embodiments. This method may be executed by the processor of the electronic device 240 or the electronic device 240 illustrated in FIG. 2.

Operations 1401 to 1405 of FIG. 14 may be related to operations 1018 of FIG. 10.

Referring to FIG. 14, in operation 1401, the electronic device 240 may extract feature points from a video sequence. For example, the electronic device 240 may extract the feature points from the video sequence in the same or similar manner as the operation of the electronic device 220 of FIG. 9.

In operation 1403, the electronic device 240 may provide data on the extracted feature points to the trained computer vision model 225.

In operation 1405, the electronic device 240 may determine whether the visual object corresponds to the vehicle appearance using the trained computer vision model 225 obtained the data.

Operations 1401 to 1405 of FIG. 14 may be applied in parallel with the methods illustrated through FIGS. 11A, 12A, and 13A, and may be applied in parallel with the methods to be described below with reference to FIGS. 15A, 16, and 17. For example, the electronic device 240 may obtain a new video sequence converted from the video sequence, extract feature points from the new video sequence as in operation 1401, provide data on the extracted feature points to the trained computer vision model 225 as in operation 1403, and determine whether the visual object corresponds to the appearance of the vehicle using the trained computer vision model 225 obtained with the data as in operation 1405.

Figure 15A:
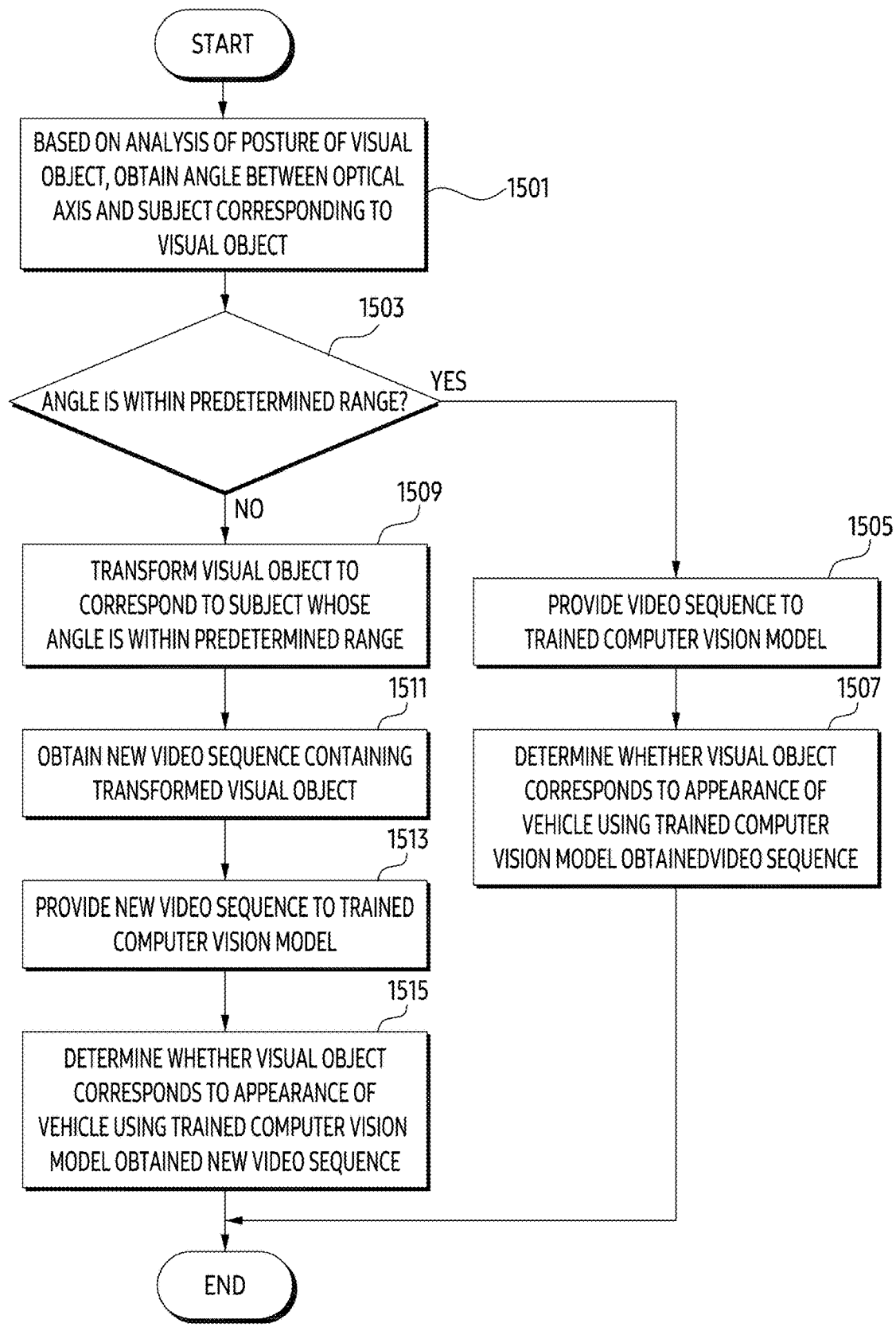
FIG. 15A is a flowchart illustrating a method of determining whether the visual object corresponds to a vehicle appearance based on a new video sequence in which the posture of the visual object is converted according to various embodiments.

FIG. 15A is a flowchart illustrating a method of determining whether the visual object corresponds to a vehicle appearance based on a new video sequence in which the posture of the visual object is converted according to various embodiments. This method may be executed by the processor of the electronic device 240 or the electronic device 240 illustrated in FIG. 2.

Operations 1501 to 1515 of FIG. 15A may be related to operations 1018 of FIG. 10.

Figure 15B:
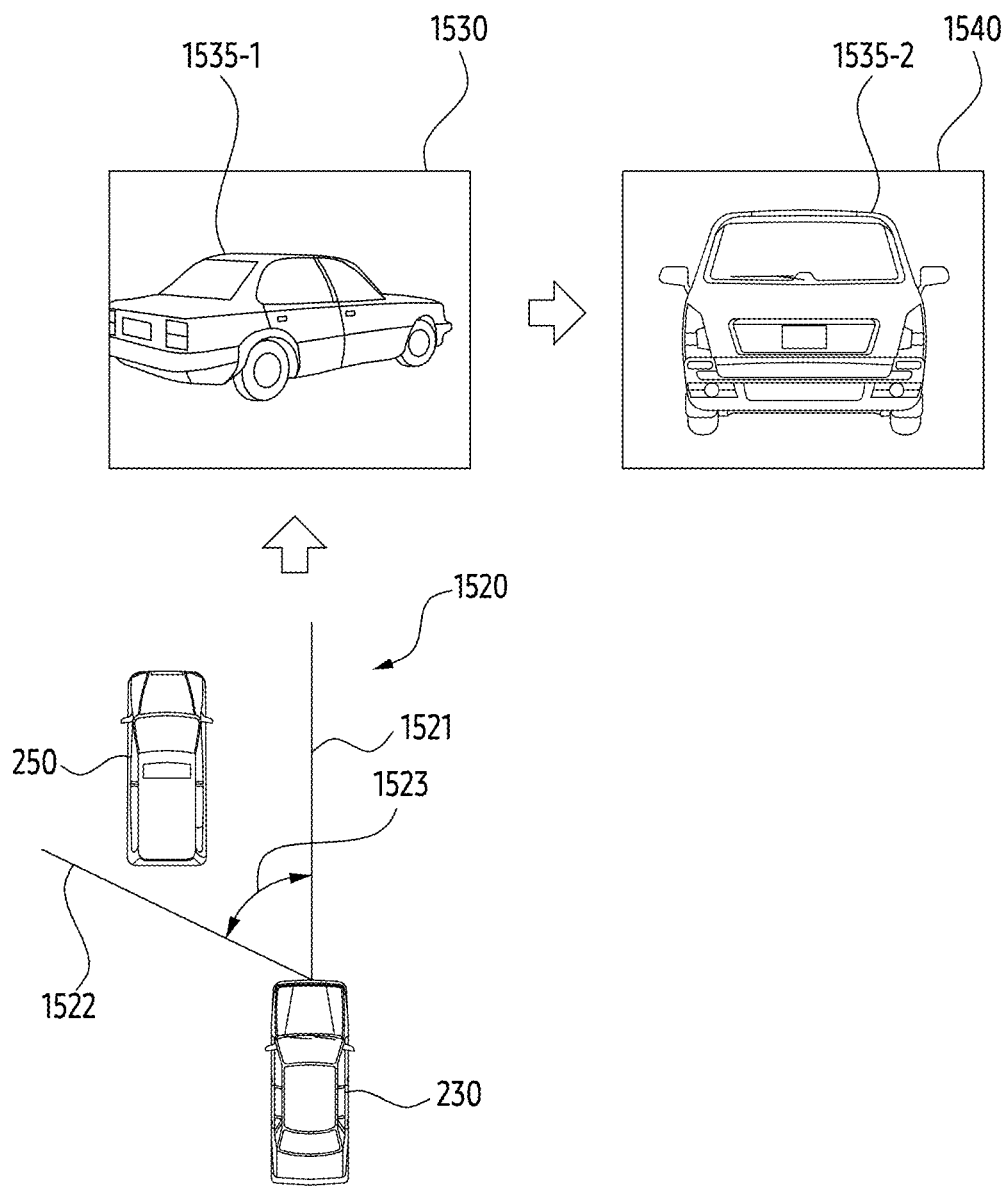
FIG. 15B illustrates an example of converting a posture of a visual object according to various embodiments.

FIG. 15B illustrates an example of converting a posture of a visual object according to various embodiments.

Referring to FIG. 15a, in operation 1501, the electronic device 240 may obtain or calculate an angle between an optical axis of a lens of a camera that obtained the video sequence and a subject corresponding to the visual object, based on analysis of the posture of the visual object detected in the video sequence. For example, the obtained angle may mean an angle between the optical axis and a straight line connecting the center point of the lens of the camera and one point of the subject. For example, referring to FIG. 15B, as in state 1520, based on the analysis of the posture of the visual object, the electronic device 240 may obtain an angle 1523 between the optical axis 1521 of the lens of the camera obtained the video sequence and a straight line 1522 connecting the center point of the lens and one point of the subject.

In operation 1503, the electronic device 240 may identify whether the angle is within a predetermined range. For example, the predetermined range may be a parameter configured in the electronic device 240 to identify whether the visual object corresponds to a subject positioned in front of the camera. In various embodiments, the predetermined range may be changed according to the reliability of the trained computer vision model 225. For example, in the case that the probability that the vehicle detection of the trained computer vision model 225 is accurate is X % when the angle is less than 30 degrees and the probability that the vehicle detection of the trained computer vision model 225 is accurate is Y % less than X % when the angle is greater than 30 degrees, the predetermined range may be set in a range of 0 degrees to 30 degrees. For another example, in the case that the probability that the vehicle detection of the trained computer vision model 225 is accurate is Z % when the angle is less than 45 degrees and the probability that the vehicle detection of the trained computer vision model 225 is accurate is W % less than Z % when the angle is greater than 34 degrees, the predetermined range may be set in a range of 0 degrees to 45 degrees. However, it is not limited thereto.

When the angle is within the predetermined range, the electronic device 240 may execute operation 1505, otherwise may execute operation 1509.

In operation 1505, the electronic device 240 may provide the video sequence obtained through the camera to the trained computer vision model 225 based on the identification that the angle is within the predetermined range.

In operation 1507, the electronic device 240 may determine whether the visual object detected in the video sequence corresponds to the appearance of the vehicle using a trained computer vision model 225 obtained the video sequence.

In operation 1509, the electronic device 240 may convert the visual object to correspond to the subject in a state in which the angle between the optical axis and the subject is within the predetermined range based on identification that the angle is outside the predetermined range. For example, referring to FIG. 15B, the electronic device 240 may convert the visual object 1535-1 in the video sequence 1530 obtained in a state in which the angle is outside the predetermined range into a visual object 1535-2 corresponding to the subject in the state in which the angle is within the predetermined range.

In operation 1511, the electronic device 240 may obtain a new video sequence including the converted visual object. For example, referring to FIG. 15B, the electronic device 240 may obtain a new video sequence 1540 including the visual object 1535-2.

In operation 1513, the electronic device 240 may provide the new video sequence to the trained computer vision model 225.

In operation 1515, electronic device 240 may determine whether the visual object detected in the video sequence corresponds to the appearance of the vehicle using the trained computer vision model 225 obtained the new video sequence.

As described above, the electronic device 240 according to various embodiments may convert the posture of the visual object provide a new video sequence including the visual object of the converted posture to the trained computer vision model 225 to determine whether the visual object in the video sequence corresponds to the appearance of the vehicle. The electronic device 240 according to various embodiments may enhance the reliability of the determination of the trained computer vision model 225 through such an operation.

Figure 16:
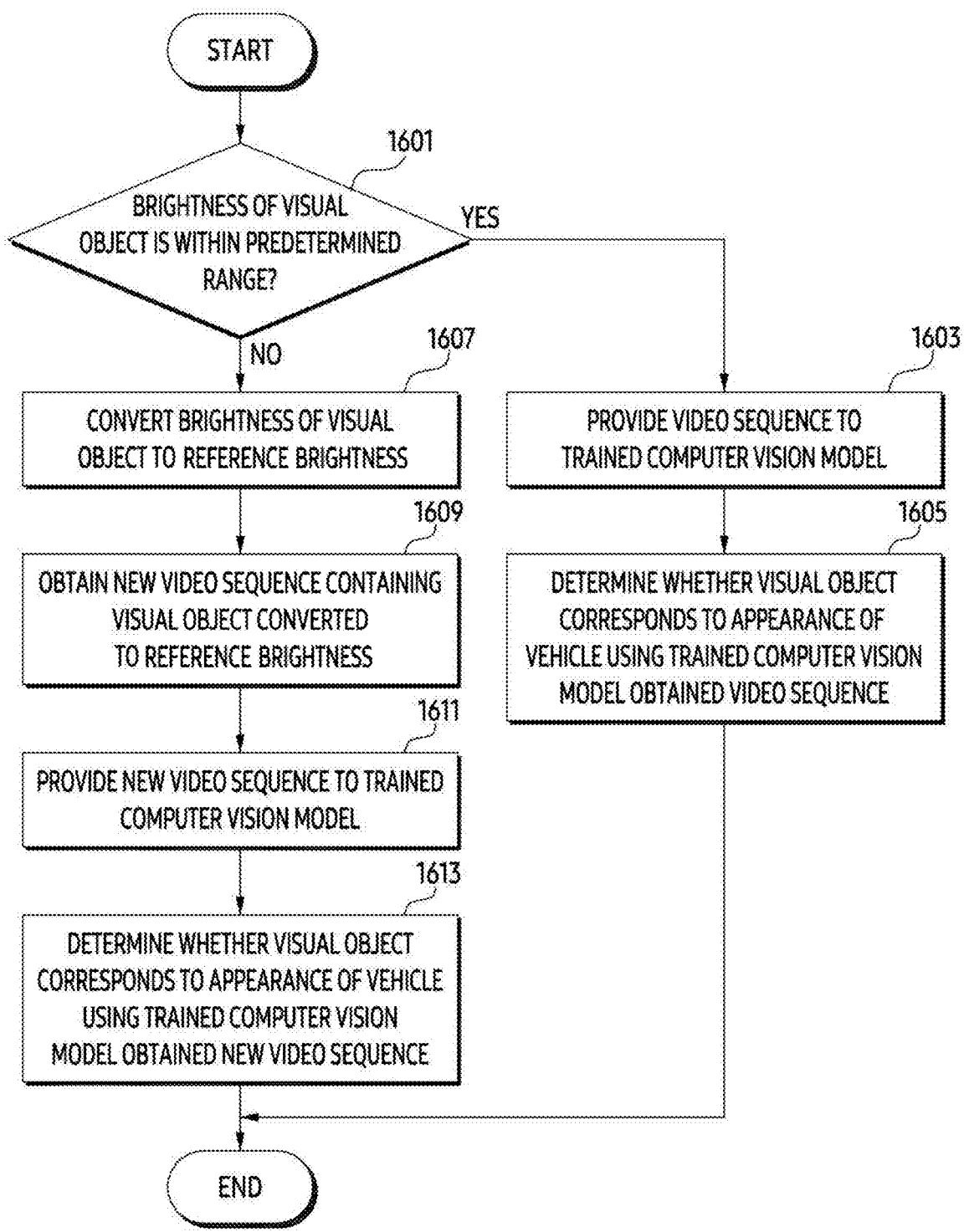
FIG. 16 is a flowchart illustrating a method of determining whether the visual object corresponds to a vehicle appearance based on a new video sequence that converts a brightness of the visual object according to various embodiments.

FIG. 16 is a flowchart illustrating a method of determining whether the visual object corresponds to a vehicle appearance based on a new video sequence that converts a brightness of the visual object according to various embodiments. This method may be executed by the processor of the electronic device 240 or the electronic device 240 illustrated in FIG. 2.

Operations 1601 to 1613 of FIG. 16 may be related to operations 1018 of FIG. 10.

Referring to FIG. 16, in operation 1601, the electronic device 240 may identify whether the brightness of the visual object detected in the video sequence is within a predetermined range. In various embodiments, the predetermined range may be changed according to the reliability of the trained computer vision model 225. For example, in case that the accuracy of vehicle detection with trained computer vision model 225 when the values for indicating the brightness are A to B is higher than the accuracy of vehicle detection with trained computer vision model 225 when the value for indicating the brightness is B to C, the predetermined range may be set to A to B. However, it is not limited thereto.

When the brightness is within the predetermined range, the electronic device 240 may execute operation 1603, otherwise may execute operation 1607.

In operation 1603, the electronic device 240 may provide the video sequence obtained through the camera to the trained computer vision model 225 based on the identification that the brightness is within the predetermined range.

In operation 1605, electronic device 240 may determine whether the visual object detected in the video sequence corresponds to the appearance of the vehicle using a trained computer vision model 225 obtained the video sequence.

In operation 1607, the electronic device 240 may convert the brightness of the visual object to a reference brightness based on the identification that the brightness is outside the predetermined range. For example, the reference brightness may be set to a brightness at which the trained computer vision model 225 may most accurately detect the vehicle.

In operation 1609, the electronic device 240 may obtain a new video sequence including the visual object converted to the reference brightness.

In operation 1611, the electronic device 240 may provide the new video sequence to trained computer vision model 225.

In operation 1613, electronic device 240 may determine whether the visual object detected in the video sequence corresponds to the appearance of the vehicle using the trained computer vision model 225 obtained the new video sequence.

As described above, in order to determine whether the visual object in the video sequence corresponds to the appearance of the vehicle, the electronic device 240 according to various embodiments may convert the brightness of the visual object and provide a new video sequence including the visual object having the converted brightness to trained computer vision model 225. The electronic device 240 according to various embodiments may enhance the reliability of the determination of the trained computer vision model 225 through such an operation.

Figure 17:
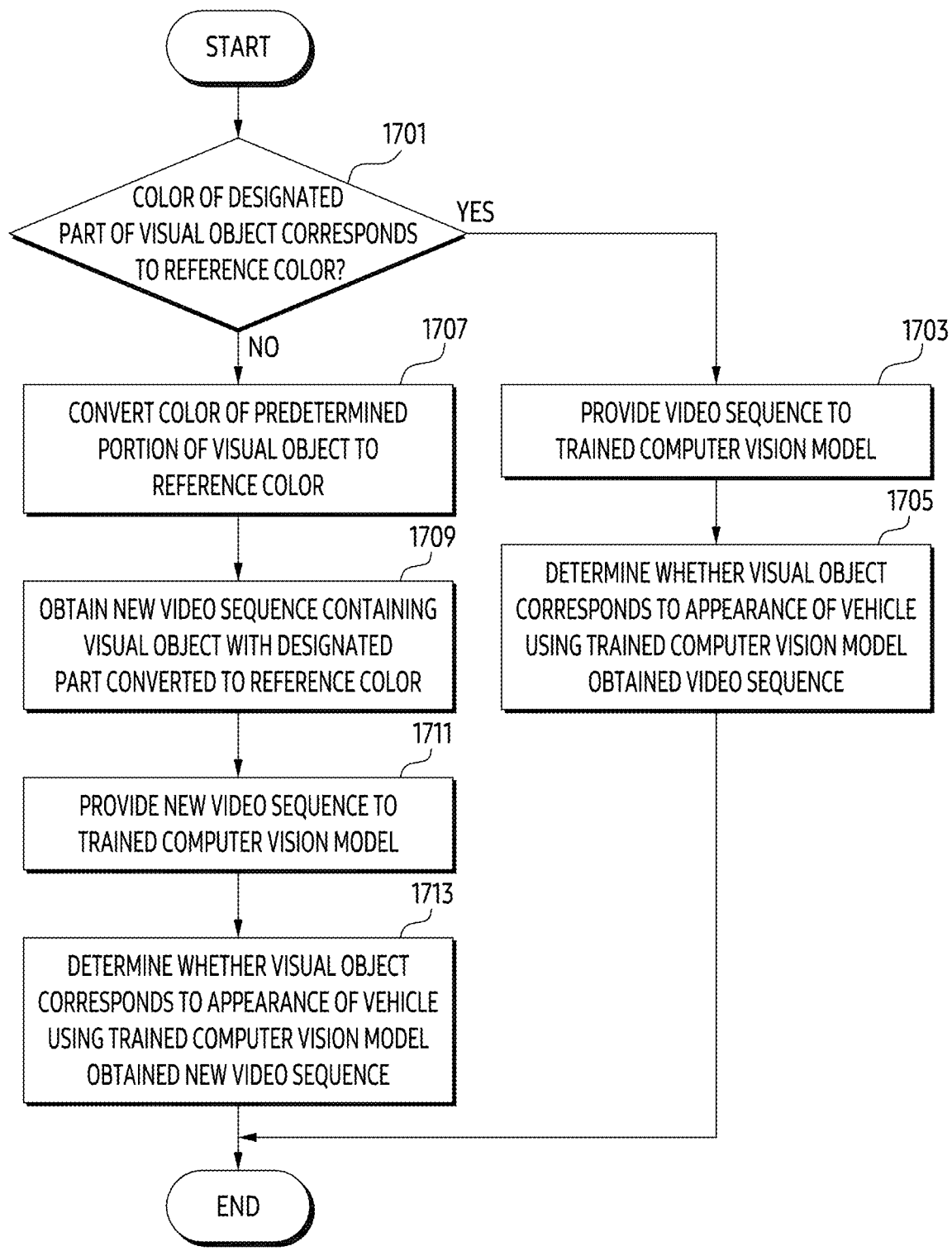
FIG. 17 is a flowchart illustrating a method of determining whether the visual object corresponds to a vehicle appearance based on a new video sequence in that converts a color of the visual object according to various embodiments.

FIG. 17 is a flowchart illustrating a method of determining whether the visual object corresponds to a vehicle appearance based on a new video sequence in that converts a color of the visual object according to various embodiments. This method may be executed by the processor of the electronic device 240 or the electronic device 240 illustrated in FIG. 2.

Operations 1701 to 1713 of FIG. 17 may be related to operations 1018 of FIG. 10.

Referring to FIG. 17, in operation 1701, the electronic device 240 may identify whether a color of a predetermined portion of the visual object detected in the video sequence corresponds to a reference color. For example, the predetermined portion may be a portion excluding at least one tail lamp, license plate, and tire from the rear of the vehicle. In other words, the predetermined portion may correspond to an exterior portion of the rear of the vehicle. In various embodiments, the reference color may be determined based on the performance of vehicle detection of the trained computer vision model 225. For example, the reference color may correspond to a color having the highest accuracy of vehicle detection of the trained computer vision model 225. However, it is not limited thereto.

Meanwhile, when the color of the predetermined portion of the visual object corresponds to the reference color, the electronic device 240 may execute operation 1703, otherwise may execute operation 1707.

In operation 1703, the electronic device 240 may provide the video sequence obtained through the camera to the trained computer vision model 225 based on identification that the color of the predetermined portion corresponds to the reference color.

In operation 1705, electronic device 240 may determine whether the visual object corresponds to the appearance of the vehicle using the trained computer vision model 225 obtained the video sequence.

In operation 1707, the electronic device 240 may convert the color of the predetermined portion of the visual object into the reference color based on identification that the color of the predetermined portion is distinguished from the reference color.

In operation 1709, the electronic device 240 may obtain a new video sequence including the visual object having the predetermined portion converted into the reference color.

In operation 1711, the electronic device 240 may provide the new video sequence to the trained computer vision model 225.

In operation 1713, the electronic device 240 may determine whether the visual object detected in the video sequence corresponds to the appearance of the vehicle using the trained computer vision model 225 obtained the new video sequence.

As described above, in order to determine whether the visual object in the video sequence corresponds to the appearance of the vehicle, the electronic device 240 according to various embodiments may convert the color of the predetermined portion of the visual object and provide a new video sequence including the visual object having the predetermined portion of the converted color to trained computer vision model 225. The electronic device 240 according to various embodiments may enhance the reliability of the determination of the trained computer vision model 225 through such an operation.

Figure 18A:
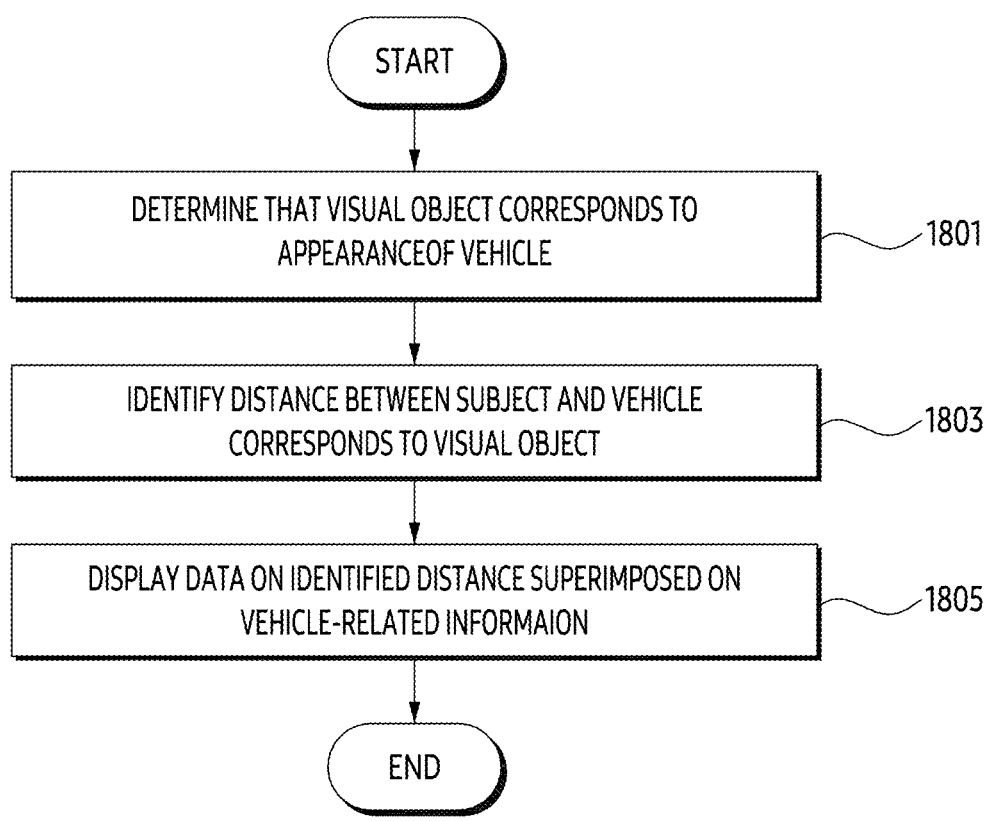
FIG. 18A is a flowchart illustrating a method of displaying information based on a determination that a visual object in a video sequence corresponds to a vehicle appearance according to various embodiments.

FIG. 18A is a flowchart illustrating a method of displaying information based on a determination that a visual object in a video sequence corresponds to a vehicle appearance according to various embodiments. This method may be executed by the processor of the electronic device 240 or the electronic device 240 illustrated in FIG. 2.

Figure 18B:
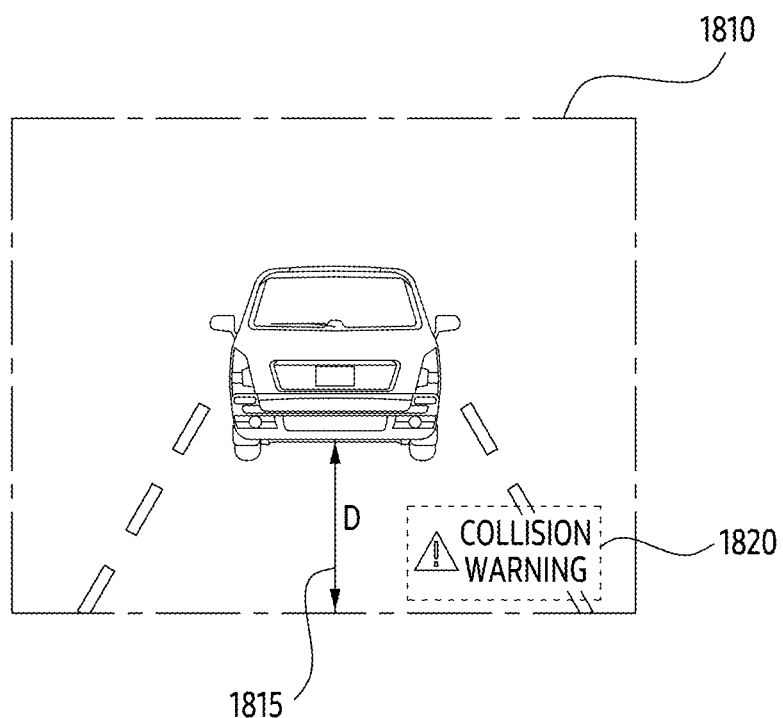
FIG. 18B illustrates an example of information displayed on the display of the electronic device 240 according to various embodiments.

FIG. 18B illustrates an example of information displayed on the display of the electronic device 240 according to various embodiments.

Figure 18C:
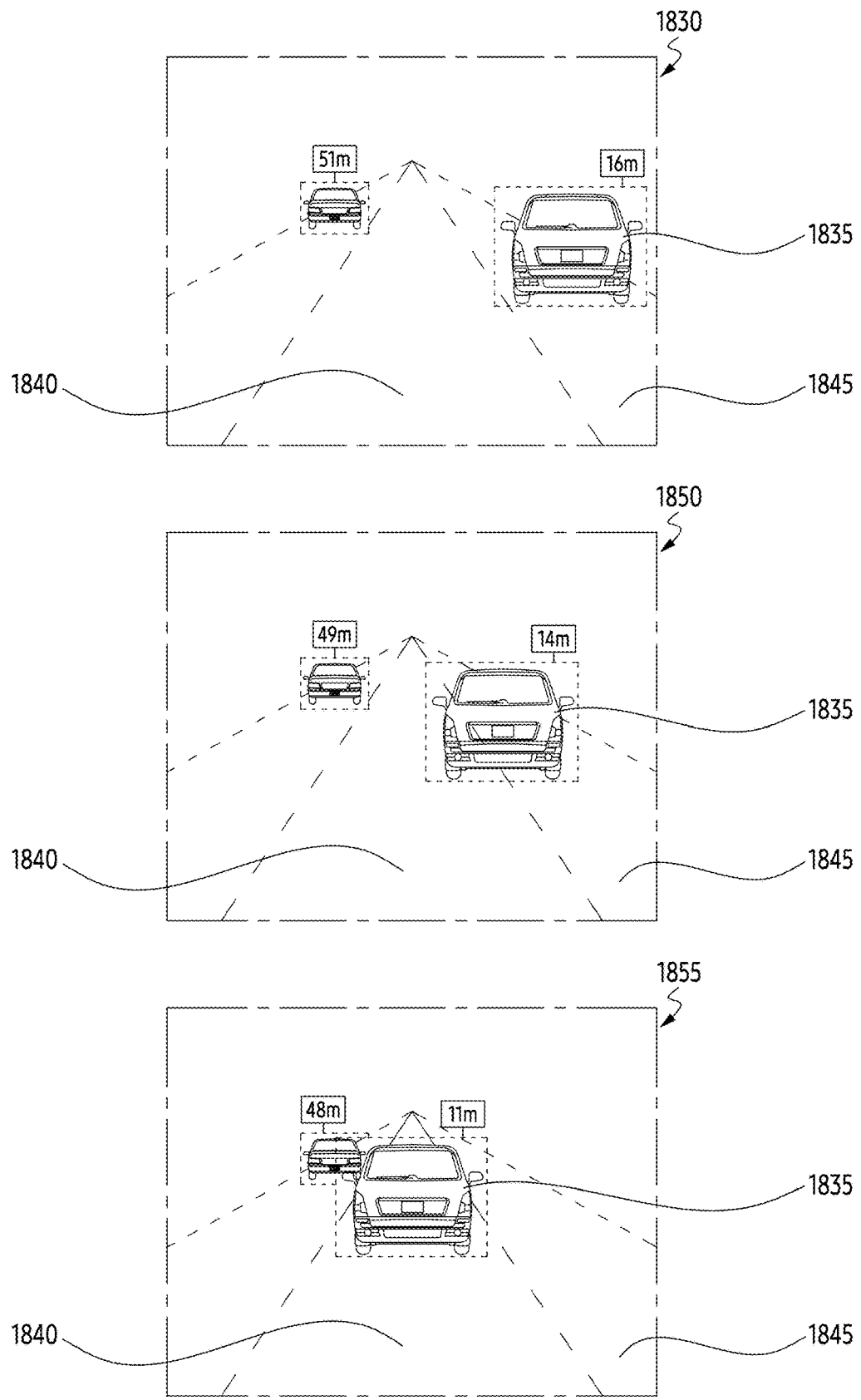
FIG. 18C illustrates an example of a method of transmitting a signal for autonomous driving based on vehicle detection according to various embodiments.

FIG. 18C illustrates an example of a method of transmitting a signal for autonomous driving based on vehicle detection according to various embodiments.

Referring to FIG. 18A, in operation 1801, the electronic device 240 may determine that a visual object in a video sequence corresponds to a vehicle appearance using a trained computer vision model 225.

In operation 1803, in response to determining that the visual object corresponds to the appearance of the vehicle using the trained computer vision model 225, the electronic device 240 may identify a distance between a subject corresponding to the visual object and the vehicle including the electronic device 240. For example, the electronic device 240 may identify the distance based on the location of the camera that has obtained the video sequence, the magnification at the time of obtaining the video sequence, and the size of the visual object. According to embodiments, the distance may be identified through a lidar sensor of the vehicle including electronic device 240. However, it is not limited thereto.

In operation 1805, in response to the identification, the electronic device 240 may display data on the identified distance by overlapping on information related to the vehicle. For example, referring to FIG. 18B, the electronic device 240 may execute operations 1801 to 1803 in a state of displaying a screen 1810 including information on the front of the vehicle. In response to the execution of operation 1803, the electronic device 240 may display the data 1815 on the distance as an overlap on the information on the screen 1810. For example, in order to provide whether the distance between the visual object and the vehicle corresponds to a safe distance, the electronic device 240 may display data 1815 as an overlap on the information on the screen 1810. Since data 1815 is displayed as an overlap on the information in the screen 1810, the driver may intuitively recognize the safety of the current driving state of the vehicle. Meanwhile, according to embodiments, the electronic device 240 may further display the notification 1820 additionally processed from the data 1815 on the screen 1810. In other words, the electronic device 240 may provide various data for helping the vehicle drive based on vehicle detection.

As described above, the electronic device 240 according to various embodiments may enhance the safety of driving of the vehicle by providing various information in the vehicle based on vehicle detection and providing various functions in the vehicle.

Meanwhile, although FIGS. 18A and 18B illustrate a case in which another vehicle is positioned in front of a vehicle including the electronic device 240, it should be noted that the embodiments of the present document are not limited thereto. In various embodiments, the electronic device 240 may provide an autonomous driving service by detecting a vehicle using computer vision model 225. For example, referring to FIG. 18C, the electronic device 240 may obtain an image 1830 through the camera 227. In various embodiments, the electronic device 240 may detect the visual object 1835 corresponding to the appearance of the vehicle from the image 1830 using the trained computer vision model 225 through the method illustrated in FIGS. 10 to 17. For example, the visual object 1835 detected from the image 1830 may correspond to another vehicle cut-in to the lane 1840 from the lane 1845 next to the lane 1840 in which the vehicle 230 is autonomously traveling. In various embodiments, in response to detecting the visual object 1835, the electronic device 240 may track the visual object 1835. In various embodiments, electronic device 240 may estimate that another vehicle corresponding to visual object 1835 will be moved from lane 1845 to lane 1840 in front of vehicle 230 based on the tracking. For example, in order to tracking visual object 1835, the electronic device 240 may identify the location of the visual object 1835 within the image 1830 and the location of the visual object 1835 within the image 1850 following the image 1830, based on a change between the location of the visual object 1835 within the image 1830 and the position of the visual object 1835 within the image 1850, estimate that the other vehicle corresponding to the visual object 1835 will be moved from the lane 1845 to the lane 1840 in front of the vehicle 230. In various embodiments, the electronic device 240 may provide a signal to the vehicle 230 for reducing the speed of the vehicle 230 being autonomously driven based on the estimation, so that the vehicle 230 does not collide with the other vehicle or that the vehicle 230 avoids the other vehicle. Alternatively, the electronic device 240 may provide a signal for increasing the speed of the other vehicle being autonomously driven to the other vehicle based on the estimation, so that the vehicle 230 does not collide with the other vehicle or that the vehicle 230 avoids the other vehicle. According to embodiments, a signal for increasing the speed of the other vehicle may be provided to the other vehicle through the vehicle 230. However, it is not limited thereto.

In various embodiments, after providing the signal for reducing the speed of the vehicle 230 to the vehicle 230 or providing the signal for increasing the speed of the other vehicle to the other vehicle, the electronic device 240 may acquire an image 1855 through the camera 227. In various embodiments, the electronic device 240 may identify the distance between the vehicle 230 and the other vehicle 230 located in front of the vehicle 230 corresponding to the visual object 1935 in the image 1855, provide at least one signal for controlling the speed of the autonomous vehicle 230 and/or the other vehicle during autonomous driving to the vehicle 230 or to the other vehicle through the vehicle 230 based on the identified distance, so that the vehicle 230 does not collide with the other vehicle.

FIGS. 10 to 18C illustrate an example in which the electronic device 240 detects another vehicle using the trained computer vision model 225 and executes at least one operation based on the detection of the other vehicle. The electronic device 240 may continuously train the computer vision model 225 while executing the operations described in FIGS. 10 to 18C. For example, while executing the operations described through the description of FIGS. 10 to 18C, the electronic device 240 may train the computer vision model 225 by receiving information on the at least one other vehicle related to the at least one other vehicle around the vehicle 230 and providing the received information to the computer vision model 225. In other words, after the electronic device 240 and the computer vision model 225 are related, while the computer vision model 225 is used for detection of another vehicle, the electronic device 240 may perform operations for continuously executing training of the computer vision model 225.

Figure 19:
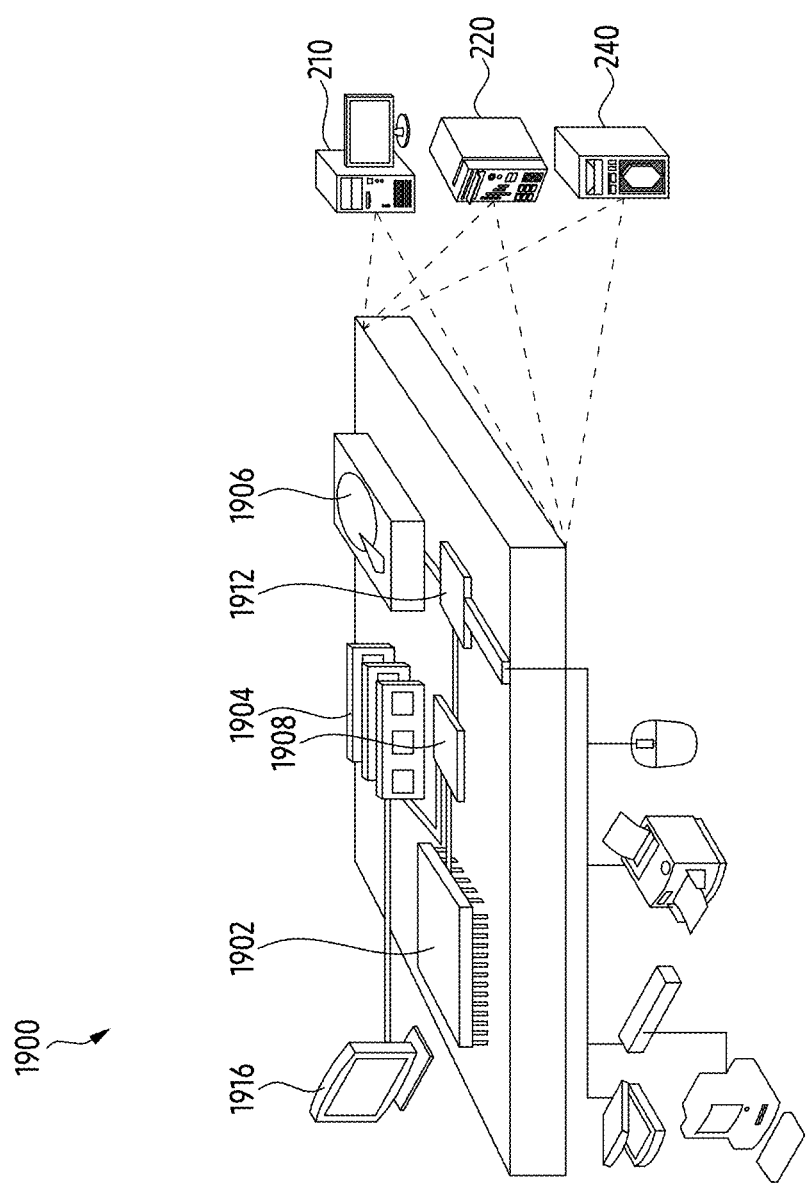
FIG. 19 is a simplified block diagram of electronic devices according to various embodiments.

FIG. 19 is a simplified block diagram of electronic devices according to various embodiments.

Referring to FIG. 19, the electronic device 1900 may be an example of the electronic device 210, the electronic device 220, or the electronic device 240. The electronic device 1900 may comprise a processor 1902, a memory 1904, a storage device 1906, high-speed controller 1908 (e.g., northbridge, MCH (Main Controller Hub)) and low-speed controller 1912 (e.g., southbridge, ICH (I/O controller hub)). In the electronic device 1900, each of the processor 1902, the memory 1904, the storage device 1906, the fast controller 1908, and the slow controller 1912 may be interconnected using various buses.

For example, the processor 1902 may process instructions for execution in the electronic device 1900 in order to display graphic information on a graphical user interface (GUI) on an external input/output device such as display 1916 connected to high-speed controller 1908. The instructions may be comprised in the memory 1904 or the storage device 1906. The instructions may cause the electronic device 1900 to perform one or more of the above-described operations when executed by processor 1902. According to embodiments, the processor 1902 may be composed of a plurality of processors including a communication processor and a GPU (graphical processing unit).

For example, the memory 1904 may store information in the electronic device 1900. For example, the memory 1904 may be a volatile memory unit or units. As another example, the memory 1904 may be a nonvolatile memory unit or units. For another example, memory 1904 may be another type of computer-readable medium, such as a magnetic or optical disk.

For example, the storage device 1906 may provide a mass storage space to the electronic device 1900. For example, storage device 1906 may be a computer-readable medium such as a hard disk device, an optical disk device, flash memory, solid state memory devices, or an array of devices in a storage area network (SAN).

For example, the high-speed controller 1908 may manage bandwidth-intensive operations for electronic device 1900, while low-speed controller 1912 may manage low bandwidth-intensive operations for electronic device 1900. For example, the high-speed controller 1908 may be coupled to the memory 1904 and coupled to the display 1916 through a GPU or accelerator, while the low speed controller 1912 may be coupled to the storage device 1906 and coupled to various communication ports (e.g., universal serial bus (USB), Bluetooth, Ethernet, wireless Ethernet) for communication with an external electronic device (e.g., keyboard, transducer, scanner, or network device (e.g., switch or router)).

As described above, an electronic device (e.g., electronic device 210) may comprise a display, an input circuit, at least one memory configured to store instructions and at least one processor which, when executing the instructions, configured to obtain, a first image; display, in response to cropping an area comprising a visual object corresponding to a potential vehicle appearance from the first image, fields for inputting an attribute for the area via the display, wherein, the fields include a first field for inputting a vehicle type as the attribute and a second field for inputting a positional relationship between a subject corresponding to the potential vehicle appearance and a camera obtained the first image as the attribute; obtain, while displaying the fields, information about the attribute, by receiving a user input for each of the fields including the first field and the second field through the input circuit; store, in response to obtaining the information, a second image configured of the area in a data set for training a computer vision model for vehicle detection.

In various embodiments, the displayed fields may further comprise a third field for inputting illuminance when obtaining the first image via the camera as the attribute.

In various embodiments, the displayed fields may further comprise a fourth field for inputting a color of the subject as the attribute.

In various embodiments, the displayed fields may further comprise a fifth field for inputting whether the visual object represents a state in which a part of the subject is covered by an object positioned between the subject and the camera as the attribute.

In various embodiments, the displayed fields may further comprise a sixth field for inputting whether the visual object in the first image displays only a part of the subject as the attribute.

In various embodiments, the second fields may comprise an input field for inputting whether the distance between the camera and the subject is greater than or equal to a predetermined distance.

In various embodiments, the second fields may further comprise an input field for inputting whether the angle between the optical axis of the camera lens and the subject is within a first predetermined range, within a second predetermined range distinguished from the first predetermined range or a third predetermined range distinguished from the first predetermined range and the second predetermined range.

In various embodiments, the processor, when executing the instructions, may be further configured to recognize that the visual object is included in the first image, in response to obtaining the first image; in response to the recognition, identify a first area including the visual object, wherein a width of the first area is wider than the width of the area; detect, by executing Sobel operation on the first area, first vertical edges with respect to the left side of the first area based on the vertical center line of the first area and second vertical edges with respect to the right side of the first area based on the vertical center line; identify the area having a portion corresponding to the maximum value among the accumulated values of the vertical histogram for the first vertical edges as the left boundary and a portion corresponding to the maximum value among the accumulated values of the vertical histogram for the second vertical edges as a right boundary, from the first area; crop the area from the first image.

In various embodiments, the computer vision model may be trained to detect a visual object corresponding to an appearance of a vehicle in an image obtained via a camera of a moving vehicle by using the data set.

In various embodiments, the visual object in the first image may display a rear of a vehicle including at least one tail lamp.

In various embodiments, an electronic device (e.g., electronic device 240) in a moving vehicle may comprise a memory comprising a trained computer vision model and instructions and at least one processor; wherein at least one processor, when executing the above instructions, may be configured to obtain a video sequence via a camera related to the vehicle; in response to detecting a visual object corresponding to a potential vehicle appearance within the obtained video sequence, identify whether the visual object is maintained for a predetermined time in the video sequence; in response to identifying that the visual object is maintained for the predetermined time in the video sequence, determine whether the visual object corresponds to a vehicle appearance using the trained computer vision model; in response to identifying that the visual object is not maintained for the predetermined time in the video sequence, bypass determining whether the visual object corresponds to a vehicle appearance using the trained computer vision model.

In various embodiments, the at least one processor, when executing the instructions, may be configured to, in response to identifying that the visual object is maintained for the predetermined time in the video sequence, obtain local movement vectors of the visual object from the video sequence; based on the local movement vectors, obtain global movement vectors of the visual object; based on the movement of the visual object estimated based on the global movement vectors, obtain a new video sequence in which the movement of the camera is compensated from the video sequence; provide the new video sequence to the trained computer vision model; determine whether the visual object corresponds to a vehicle appearance using the trained computer vision model obtained the new video sequence.

In various embodiments, the at least one processor, when executing the instructions, may be configured to, in response to identifying that the visual object is maintained for the predetermined time in the video sequence, obtain data on a movement of the camera from the camera; based on the data, obtain a new video sequence in which the movement of the camera is compensated from the video sequence; provide the new video sequence to the trained computer vision model; determine whether the visual object corresponds to the vehicle appearance using the trained computer vision model obtained the new video sequence.

In various embodiments, the at least one processor, when executing the instructions, may be configured to in response to identifying that the visual object is maintained for the predetermined time in the video sequence, identify an area corresponding to the background of the visual object from the video sequence; obtain data on the movement of the identified area; based on the data, a new video sequence in which the movement of the camera is compensated from the video sequence; determine whether the visual object corresponds to the vehicle appearance using the trained computer vision model obtained the new video sequence.

In various embodiments, the at least one processor, when executing the instructions, may be configured to in response to identifying that the visual object is maintained for the predetermined time in the video sequence, extract feature points from the video sequence; provide data on the extracted feature points to the trained computer vision model; determine whether the visual object corresponds to the vehicle appearance using the trained computer vision model obtained the data.

In various embodiments, the at least one processor, when executing the instructions, may be configured to in response to identifying that the visual object is maintained for the predetermined time in the video sequence, obtain an angle between an optical axis of a lens of the camera and the subject corresponding to the visual object; identify whether the angle is within a predetermined angle; based on identifying that the angle is within the predetermined range, provide the video sequence to the trained computer vision model; determines whether the visual object corresponds to the vehicle appearance using the trained computer vision model obtained the video sequence; based on identifying that the angle is outside the predetermined range, convert the visual object to correspond to the subject in the state in which the angle is within the predetermined range; obtain anew video sequence including the converted visual object; provide the new video sequence to the trained computer vision model; and determine whether the converted visual object corresponds to the vehicle appearance using the trained computer vision model obtained the new video sequence.

In various embodiments, the at least one processor, when executing the instructions, may be configured to in response to identifying that the visual object is maintained for the predetermined time in the video sequence, identify whether the brightness of the visual object is within a predetermined range; in response to identifying that the brightness is within the predetermined range, provide the video sequence to the trained computer vision model, and determine whether the visual object corresponds to the vehicle appearance using the trained computer vision model obtained the video sequence; in response to identifying that the brightness is outside the predetermined range, obtain a new video sequence including the visual object converted from the brightness to the reference brightness; provide the new video sequence to the trained computer vision model; and determine whether the visual object corresponds to the vehicle appearance using the trained computer vision model obtained the new video sequence.

In various embodiments, the at least one processor, when executing the instructions, may be configured to in response to identifying that the visual object is maintained for the predetermined time in the video sequence, identify whether the color of the predetermined portion of the visual object corresponds to a reference color; based on identifying that the color of the predetermined part of the visual object corresponds to the reference color, provide the video sequence to the trained computer vision model, and determine whether the visual object corresponds to the vehicle appearance using the trained computer vision model obtained the video sequence; based on identifying that the color of the predetermined part of the visual object is different from the reference color, convert the color of the predetermined portion of the visual object into the reference color; obtain a new video sequence including the visual object having the predetermined portion converted into the reference color; provide the new video sequence to the trained computer vision model; and determine whether the visual object converted into the reference color corresponds to the vehicle appearance using the trained computer vision model obtained the new video sequence.

In various embodiments, the electronic device may further comprise display, wherein the at least one processor, when executing the instructions, may be further configured to in response to determining that the visual object corresponds to the vehicle appearance using the trained computer vision model, identify a distance between the subject corresponding to the visual object and the vehicle including the electronic device; and display, displayed via the display, data on the identified distance, by overlapping on information related to the vehicle including the electronic device.

In various embodiments, the electronic device may further comprise communication circuit, wherein the at least one processor, when executing the instructions, may be further configured to in response to determining that the visual object corresponds to the vehicle appearance using the trained computer vision model, transmit a signal for executing a function in a vehicle including the electronic device through the communication circuit, based on the recognition that the visual object is a vehicle.

Figure 20:
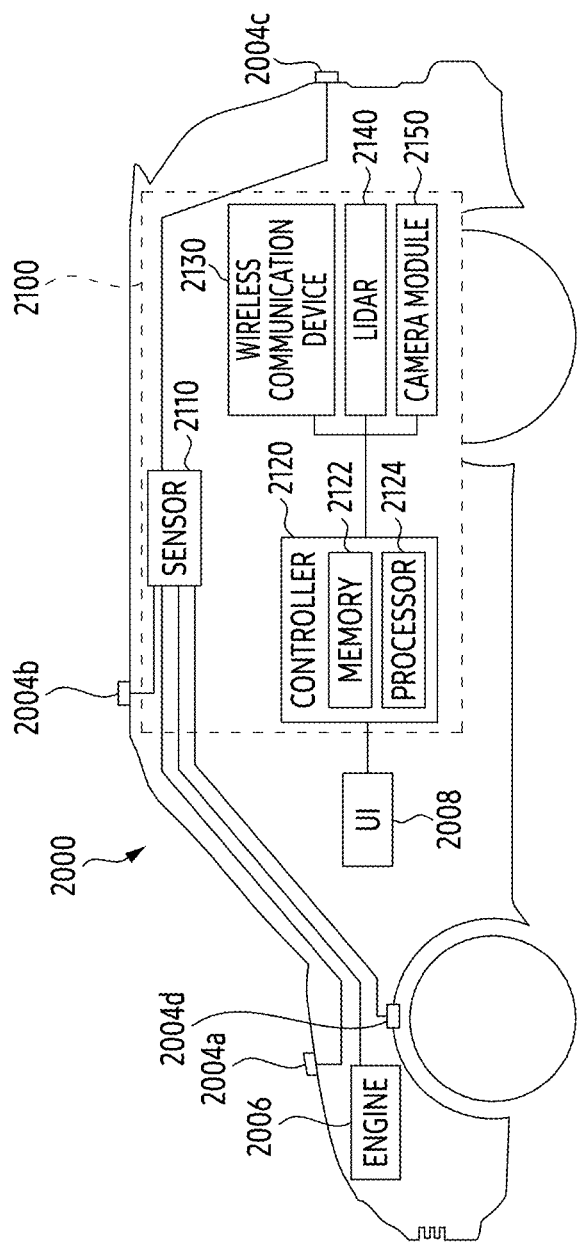
FIG. 20 illustrates an example of a vehicle including an electronic device according to various embodiments.

FIG. 20 illustrates an example of a vehicle including an electronic device according to various embodiments. For example, the vehicle may be the vehicle 230 illustrated in FIG. 2.

Figure 21:
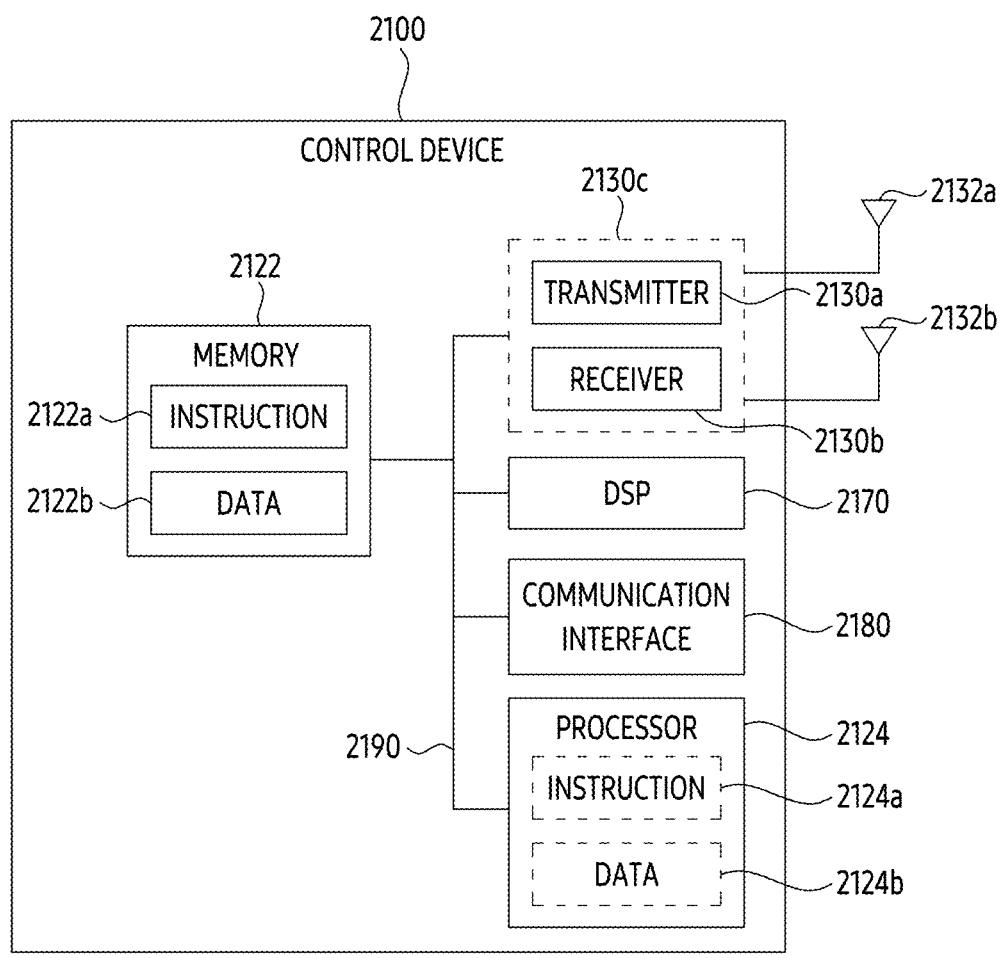
FIG. 21 illustrates an example of a functional configuration of an electronic device according to various embodiments.

FIG. 21 illustrates an example of a functional configuration of an electronic device according to various embodiments. Such a functional configuration may be included in the electronic device 240 illustrated in FIG. 2.

Figure 22:
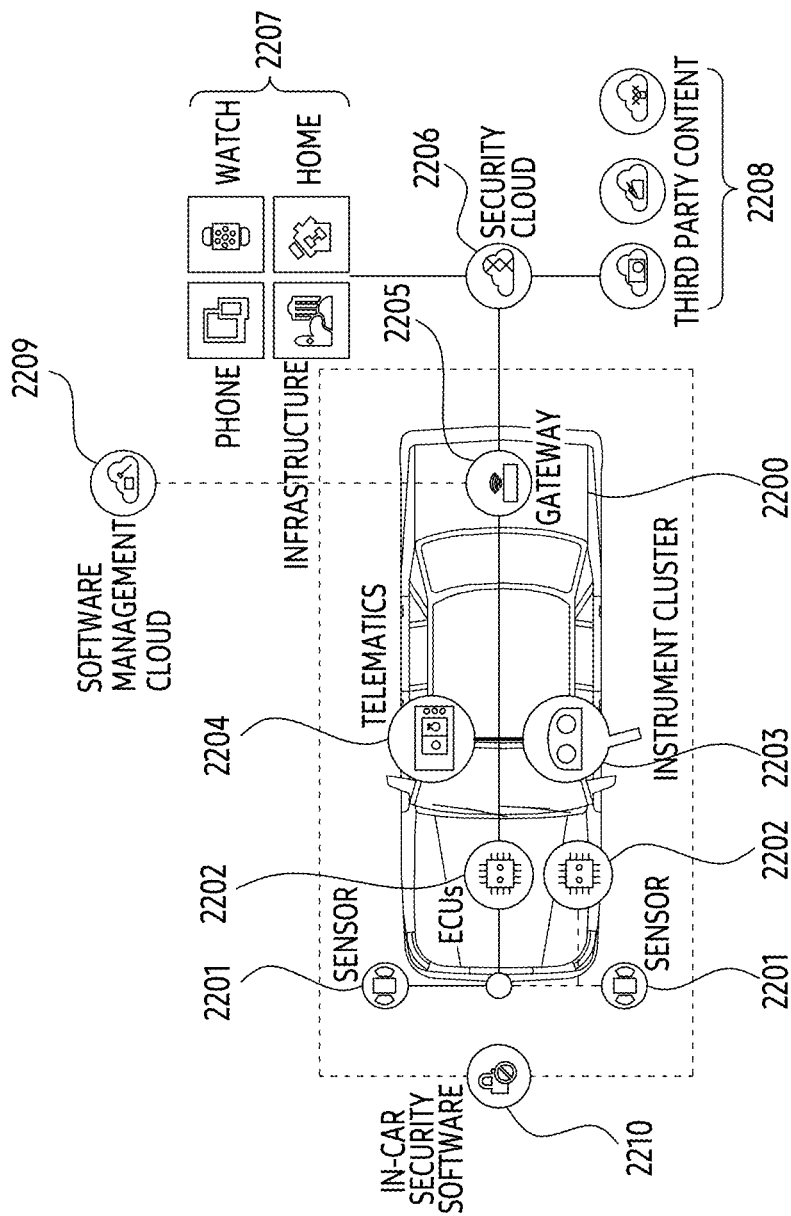
FIG. 22 illustrates an example of a gateway related to an electronic device according to various embodiments.

FIG. 22 illustrates an example of a gateway related to an electronic device according to various embodiments. Such a gateway may be related to the electronic device 240 illustrated in FIG. 2.

Referring to FIGS. 20 and 21, the control device 2100 (e.g., the electronic device 240 of FIG. 2) according to various embodiments may be mounted on the vehicle 2000 (e.g., the vehicle 230).

In various embodiments, the control device 2100 may include a controller 2120 including a memory 2122 and a processor 2124, and a sensor 2130.

According to various embodiments, the controller 2120 may be configured by a manufacturer of a vehicle or may be additionally configured to perform a function of autonomous driving after manufacturing. Alternatively, a configuration for continuously performing additional functions may be included through an upgrade of the controller 2120 configured during manufacturing.

The controller 2120 may transmit the control signal to the sensor 2110, the engine 2006, the user interface 2008, the wireless communication device 2130, the LIDAR 2140, and the camera module 2150 included in other components in the vehicle. In addition, although not shown, the controller 2120 may transmit a control signal to an acceleration device, a braking system, a steering device, or a navigation device related to driving of the vehicle.

In various embodiments, the controller 2120 may control the engine 2006, for example, detect the speed limit on the road where the autonomous vehicle 2000 is traveling, control the engine 2006 so that the driving speed does not exceed the speed limit, or control the engine 2006 to accelerate the driving speed of the autonomous vehicle 2000 within a speed limit. In addition, when sensing modules 2004A, 2004B, 2004C, and 2004D detect the environment outside the vehicle and transmit it to the sensor 2110, the controller 2120 may receive it and generate a signal for controlling the engine 2006 or the steering device (not shown) to control driving of the vehicle.

When there is another vehicle or obstruction in front of the vehicle, the controller 2120 may control the engine 2006 or the braking system to decelerate the driving vehicle and in addition to speed, control a trajectory, a driving path, and a steering angle. Alternatively, the controller 2120 may control driving of the vehicle by generating a necessary control signal according to recognition information of other external environments such as a driving lane of the vehicle and a driving signal.

By performing communication with neighboring vehicles or central servers in addition to generating their own control signals and transmitting commands for controlling peripheral devices through the received information, the controller 2120 may also control driving of the vehicle.

In addition, when the position of the camera module 2150 is changed or the angle of view is changed, accurate vehicle or lane recognition may be difficult, to prevent this, the controller 2120 may generate a control signal for controlling the camera module 2150 to perform calibration. In other words, even when the mounting position of the camera module 2150 is changed due to vibration or impact generated by the movement of the autonomous vehicle 2000, the controller 2120 may continuously maintain a normal mounting position, direction, and angle of view of the camera module 2150 by generating a calibration control signal to the camera module 2150. When the initial mounting position, direction, and angle of view information of the camera module 2120 stored in advance and the initial mounting position, direction, and angle of view information of the camera module 2120 measured while driving of the autonomous vehicle 2000 vary above a threshold value, the controller 2120 may generate a control signal to perform calibration of the camera module 2120.

According to various embodiments, the controller 2120 may comprise a memory 2122 and a processor 2124. The processor 2124 may execute the software stored in the memory 2122 according to the control signal of the controller 2120. Specifically, the controller 2120 stores data and instructions for scrambling audio data according to various embodiments in the memory 2122, and the instructions may be executed by processor 2124 to implement one or more methods disclosed herein.

In various embodiments, the memory 2122 may be stored in a recording medium executable by the processor 2124. The memory 2122 may store software and data through an appropriate internal and external device. The memory 2122 may be configured as a device connected to random access memory (RAM), read only memory (ROM), hard disk, and dongle.

The memory 2122 may store at least an operating system (OS), a user application, and executable commands. The memory 2122 may also store application data and array data structures.

The processor 2124 may be a controller, microcontroller, or state machine as a microprocessor or an appropriate electronic processor.

The processor 2124 may be implemented as a combination of computing devices, the computing device may be a digital signal processor, microprocessor, or configured in an appropriate combination thereof.

In addition, according to various embodiments, the control device 2100 may monitor internal and external features of the autonomous vehicle 2000 and detect a state thereof with at least one sensor 2110.

The sensor 2110 may be configured with at least one sensing module 2004 (e.g., sensor 2004A, sensor 2004B, sensor 2004C, and sensor 2004D), the sensing module 2004 may be implemented at a specific location of the autonomous vehicle 2000 according to the sensing purpose. For example, the sensing module 2004 may be located at a lower end, a rear end, a front end, an upper end, or a side end of the autonomous vehicle 2000, and may also be located at an internal component or tire of the vehicle.

Through this, the sensing module 2004 may detect information related to driving, such as engine 2006, tire, steering angle, speed, vehicle weight, and the like, as internal information of the vehicle. In addition, at least one sensing module 2004 may include an acceleration sensor, a gyroscope, an image sensor, a RADAR, an ultrasonic sensor, a LiDAR sensor and the like, and detect movement information of the autonomous vehicle 2000.

The sensing module 2004 may receive specific data on an external environmental state such as state information of a road on which the autonomous vehicle 2000 is located, surrounding vehicle information, weather, and the like, and may detect vehicle parameters accordingly. The detected information may be stored in the memory 2122, temporarily or in the long term, depending on the purpose.

According to various embodiments, the sensor 2110 may integrate and collect information of sensing modules 2004 for collecting information generated inside and outside the autonomous vehicle 2000.

The control device 2100 may further comprise a wireless communication device 2130.

The wireless communication device 2130 is configured to implement wireless communication between autonomous vehicles 2000. For example, the autonomous vehicle 2000 may communicate with a user's mobile phone, another wireless communication device 2130, another vehicle, a central device (traffic control device), a server, and the like. The wireless communication device 2130 may transmit and receive a wireless signal according to a connection wireless protocol. A wireless communication protocols may be Wi-Fi, Bluetooth, Long-Term Evolution (LTE), Code Division Multiple Access (CDMA), Wideband Code Division Multiple Access (WCDMA), Global Systems for Mobile Communications (GSM), and the communication protocol is not limited thereto.

In addition, according to various embodiments, in addition, according to various embodiments, the autonomous vehicle 2000 may implement communication between vehicles through the wireless communication device 2130. In other words, the wireless communication device 2130 may communicate with other vehicles and other vehicles on the road through V2V (vehicle-to-vehicle communication or V2X). The autonomous vehicle 2000 may transmit and receive information such as a driving warning and traffic information through communication between vehicles and may request information or receive requests from other vehicles. For example, the wireless communication device 2130 may perform V2V communication with a dedicated short-range communication (DSRC) device or a cellular-V2V (C-V2V) device. Besides communication between vehicles, V2X (vehicle to everything communication) between the vehicle and other objects (e.g., electronic devices carried by pedestrians) may also be implemented through the wireless communication device 2130.

In addition, the control device 2100 may comprise the LIDAR device 2140. The LIDAR device 2140 may detect an object around the autonomous vehicle 2000 during operation Using data sensed through a LIDAR sensor. The LIDAR device 2140 may transmit the detected information to the controller 2120, and the controller 2120 may operate the autonomous vehicle 2000 according to the detection information. For example, when there is a vehicle ahead moving at low speed in the detection information, the controller 2120 may command the vehicle to slow down through the engine 2006. Alternatively, the vehicle may be ordered to slow down according to the curvature of the curve into which it is entering.

The control device 2100 may further comprise a camera module 2150. The controller 2120 may extract object information from an external image photographed by the camera module 2150 and allow the controller 2120 to process information on the information.

In addition, the control device 2100 may further comprise imaging devices for recognizing an external environment. In addition to the LIDAR 2140, RADAR, GPS devices, driving distance measuring devices (Odometry), and other computer vision devices may be used, and these devices operate selectively or simultaneously as needed to enable more precise detection.

The autonomous vehicle 2000 may further comprise a user interface 2008 for user input to the control device 2100 described above. User interface 2008 may allow the user to input information with appropriate interaction. For example, it may be implemented as a touch screen, a keypad, an operation button, or the like. The user interface 2008 may transmit an input or command to the controller 2120, and the controller 2120 may perform a vehicle control operation in response to the input or command.

In addition, the user interface 2008 may perform communication with the autonomous vehicle 2000 through the wireless communication device 2130 which is a device outside the autonomous vehicle 2000. For example, the user interface 2008 may enable interworking with a mobile phone, tablet, or other computer device.

Furthermore, according to various embodiments, although the autonomous vehicle 2000 is described as including the engine 2006, may also comprise other types of propulsion systems. For example, the vehicle may be operated with electrical energy and may be operated through hydrogen energy, or a hybrid system combined with the same. Accordingly, the controller 2120 may include a propulsion mechanism according to a propulsion system of the autonomous vehicle 2000 and provide a control signal accordingly to the components of each propulsion mechanism.

Hereinafter, a detailed configuration of the control device 2100 for scrambling audio data according to various embodiments will be described in more detail with reference to FIG. 21.

The control device 2100 includes a processor 2124. The processor 2124 may be a general purpose single or multi-chip microprocessor, a dedicated microprocessor, a microcontroller, a programmable gate array, or the like. The processor may be referred to as a central processing unit (CPU). In addition, according to various embodiments, the processor 2124 may be used as a combination of a plurality of processors.

The control device 2100 also comprises a memory 2122. The memory 2122 may be any electronic component capable of storing electronic information. The memory 2122 may also include a combination of memories 2122 in addition to a single memory.

According to various embodiments, data and instructions 2122a for scrambling audio data may be stored in the memory 2122. When the processor 2124 executes the instructions 2122a, the instructions 2122a and all or part of the data 2122b required for executing the instructions may be loaded onto the processor 2124 (e.g., the instructions 2124A, the data 2124B).

The control device 2100 may include a transmitter 2130A, a receiver 2130B, or a transceiver 2130C for allowing transmission and reception of signals. One or more antennas 2132A and 2132B may be electrically connected to a transmitter 2130A, a receiver 2130B, or each transceiver 2130C, and may additionally comprise antennas.

The control device 2100 may comprise a digital signal processor DSP 2170. The DSP 2170 may enable the vehicle to quickly process the digital signal.

The control device 2100 may comprise a communication interface 2180. The communication interface 2180 may comprise one or more ports and/or communication modules for connecting other devices to the control device 2100. The communication interface 2180 may allow the user and the control device 2100 to interact.

Various configurations of the control device 2100 may be connected together by one or more buses 2190, the buses 2190 may comprise a power bus, a control signal bus, a state signal bus, a data bus, and the like. Under the control of the processor 2124, the configurations may transmit mutual information and perform a desired function through the bus 2190.

Meanwhile, in various embodiments, the control device 2100 may be related to a gateway for communication with the secure cloud. For example, referring to FIG. 22, the control device 2100 may be related to the gateway 2205 for providing information obtained from at least one of the components 2201 to 2204 of the vehicle 2200 (e.g., the vehicle 230) to the secure cloud 2206. For example, the gateway 2205 may be comprised in the control device 2100. For another example, gateway 2205 may be configured as a separate device in vehicle 2200 distinguished from control device 2100. Gateway 2205 connects software management cloud 2209 having different networks, secure cloud 2206 and network in secured vehicle 2200 by in-vehicle security software 2210 to be enable communication.

For example, component 2201 may be a sensor. For example, the sensor may be used to obtain information on at least one of a state of the vehicle 2200 or a state around the vehicle 2200. For example, component 2201 may comprise a sensor 2110.

For example, component 2202 may be electronic control units (ECUs). For example, the ECUs may be used for engine control, transmission control, airbag control, and tire pressure management.

For example, component 2203 may be an instrument cluster. For example, the instrument cluster may refer to a panel positioned in front of a driver's seat among dashboards. For example, the instrument cluster may be configured to show information necessary for driving to a driver (or passenger). For example, the instrument cluster may be used to display at least one of Visual elements for indicating revolution per minute (RPM), the speed of the vehicle 2200, the amount of residual fuel, gear conditions and information obtained through component 2201.

For example, component 2204 may be a telematics device. For example, the telematics device may refer to a device that provides various mobile communication services such as location information and safe driving in a vehicle 2200 by combining wireless communication technology and global positioning system (GPS) technology. For example, the telematics device may be used to connect the driver, the cloud (e.g., secure cloud 2206), and/or the surrounding environment to the vehicle 2200. For example, the telematics device may be configured to support high bandwidth and low latency for technology of 5G NR standard (e.g., V2X technology of 5G NR). For example, the telematics device may be configured to support autonomous driving of the vehicle 2200.

For example, gateway 2205 may be used to connect a network in the vehicle 2200 to a software management cloud 2209, which are out-of-vehicle networks and a secure cloud 2206. For example, the software management cloud 2209 may be used to update or manage at least one software required for driving and managing the vehicle 2200. For example, the software management cloud 2209 may be linked with in-car security software 2210 installed in the vehicle. For example, in-vehicle security software 2210 may be used to provide a security function in the vehicle 2200. For example, the in-vehicle security software 2210 may encrypt data transmitted and received through the in-vehicle network using an encryption key obtained from an external authorized server for encryption of the in-vehicle network. In various embodiments, the encryption key used by in-vehicle security software 2210 may be generated corresponding to vehicle identification information (vehicle license plate, or information uniquely assigned to each user (e.g., user identification information, vehicle identification number).

In various embodiments, gateway 2205 may transmit data encrypted by in-vehicle security software 2210 to software management cloud 2209 and/or secure cloud 2206 based on the encryption key. Software management cloud 2209 and/or secure cloud 2206 may identify that data was received from which vehicle or from which user, by decrypting the data encrypted by the encryption key of the security software 2210 in the vehicle using a decryption key capable of decrypting the data. For example, since the decryption key is a unique key corresponding to the encryption key, the software management cloud 2209 and/or the secure cloud 2206 may identify a sender (e.g., a vehicle or a user) of data based on the decryption key.

For example, gateway 2205 may be configured to support in-vehicle security software 2210 and may be related to control device 2100. For example, gateway 2205 may be related to control device 2100 to support a connection between client device 2207 connected to secure cloud 2206 and control device 2100. For another example, gateway 2205 may be related to control device 2100 to support a connection between third-party cloud 2208 connected to secure cloud 2206 and control device 2100. However, it is not limited thereto.

In various embodiments, the gateway 2205 may be used to connect the vehicle 2200 with the software management cloud 2209 for managing the operating software of the vehicle 2200. For example, the software management cloud 2209 may monitor whether update of the operating software of the vehicle 2200 is required and provide data for updating the operating software of the vehicle 2200 through the gateway 2205 based on monitoring the request for updating the operating software of the vehicle 2200. For another example, the software management cloud 2209 may receive a user request for updating the operating software of the vehicle 2200 from the vehicle 2200 through the gateway 2205 and provide data for updating the operating software of the vehicle 2200 based on the reception. However, it is not limited thereto.

The device described above may be implemented as a hardware component, a software component, and/or a combination of hardware components and software components. For example, the devices and components described in the embodiments may be implemented using one or more general purpose computers or special purpose computers such as processor, controller, ALU (arithmetic logic unit), digital signal processor, microcomputer, FPGA (field programmable gate array), PLU (programmable logic unit), microprocessor or any other device capable of executing and responding to instructions. The processing device may perform an operating system (OS) and one or more software applications performed on the operating system. In addition, the processing device may access, store, manipulate, process, and generate data in response to execution of the software. For convenience of understanding, although it may be described that one processing device is used, a person skilled in the art may see that the processing device may include a plurality of processing elements and/or a plurality of types of processing elements. For example, the processing device may include a plurality of processors or one processor and one controller. In addition, other processing configurations such as parallel processors are possible.

The software may comprise a computer program, code, instruction, or a combination of one or more of these, configure the processing device to operate as desired, or command the processing device independently or collectively. Software and/or data may be embodied in any type of machine, component, physical device, computer storage medium, or device to be interpreted by a processing device or to provide instructions or data to a processing device. The software may be distributed on networked computer systems and stored or executed in a distributed manner. Software and data may be stored in one or more computer-readable recording media.

The method according to the embodiment may be implemented in the form of a program command that may be performed through various computer means and recorded on a computer-readable medium. In this case, the medium may continue to store a computer-executable program, or may temporarily store the program for execution or download. In addition, the medium may be various recording or storage means in which a single or several hardware is combined, and may not be limited to a medium directly connected to a computer system, but may be distributed over a network. Examples of media comprise magnetic media such as hard disks, floppy disks, and magnetic tape, optical recording media such as CD-ROM and DVD, magneto-optical medium, such as a floptical disk, anything configured to store program instructions, including ROM, RAM, flash memory, etc. In addition, examples of other media include app stores that distribute applications, sites that supply or distribute other various software, and recording media or storage media managed by servers.

Although embodiments have been described according to limited embodiments and drawings as above, various modifications and modifications are possible from the above description to those of ordinary skill in the art. For example, appropriate results may be achieved if the described techniques are performed in a different order from the described methods, and/or components such as systems, structures, devices, and circuits are combined or combined in a different form from the described methods.

Thus, other implementations, other embodiments, and those equivalent to the claims also fall within the scope of the claims to be described later.

What is claimed is:

1. A non-transitory computer readable storage medium storing one or more programs, the one or more programs comprising instructions which, when executed by an electronic device with a display and input circuitry, cause the electronic device to:
    display, via the display, an electronic map;
    receive, via the input circuitry, an input on a position of the electronic map;
    based on the input, display, via the display, a road view image representing the position of the electronic map;
    based on the road view image being identified as a first image including a visual object corresponding to a potential vehicle appearance, crop an area including the visual object from the first image, and display, via the display, user interface (UI) fields for inputting an attribute for the area, wherein the fields include a first UI field for inputting a vehicle type as the attribute and a second UI field for inputting a position relationship between a subject corresponding to the potential vehicle appearance and a camera obtained the first image as the attribute;
    receive, via the input circuitry, a user input for each of the UI fields;
    based on the user input, obtain information on the attribute including the vehicle type of the visual object and the position relationship between the subject and the camera;
    based on obtaining the information, store a second image configured of the area in conjunction with the information in a data set;
    identify feature points from the data set; and
    provide the feature points to a computer vision model for training the computer vision model for vehicle detection.

2. The non-transitory computer readable storage medium of claim 1, wherein the displayed UI fields further comprise a third UI field for inputting illuminance when obtaining the first image via the camera as the attribute.

3. The non-transitory computer readable storage medium of claim 2, wherein the displayed UI fields further comprise a fourth UI field for inputting a color of the subject as the attribute.

4. The non-transitory computer readable storage medium of claim 3, wherein the displayed UI fields further comprise a fifth UI field for inputting whether the visual object represents a state in which a part of the subject is covered by an object positioned between the subject and the camera as the attribute.

5. The non-transitory computer readable storage medium of claim 1, wherein the one or more programs comprises instructions which, when executed by the electronic device, cause the electronic device to:
    based on the road view image being identified as the first image including the visual object, recognize that the visual object is included in the first image;
    based on the recognition, identify a first area including the visual object, wherein a width of the first area is wider than the width of the area;
    detect, by executing Sobel operation on the first area, first vertical edges with respect to the left side of the first area based on the vertical center line of the first area and second vertical edges with respect to the right side of the first area based on the vertical center line;
    identify the area having a portion corresponding to the maximum value among the accumulated values of the vertical histogram for the first vertical edges as the left boundary and a portion corresponding to the maximum value among the accumulated values of the vertical histogram for the second vertical edges as a right boundary, from the first area; and
    crop the area from the first image.

6. The non-transitory computer readable storage medium of claim 1, wherein the computer vision model is trained to detect a visual object corresponding to an appearance of a vehicle in an image obtained via a camera of a moving vehicle by using the data set.

7. The non-transitory computer readable storage medium of claim 1, wherein the visual object in the first image displays a rear of a vehicle including at least one tail lamp.

8. The non-transitory computer readable storage medium of claim 1, the one or more programs comprising instructions which, when executed by the electronic device, cause the electronic device to:
    based on the road view image being identified as a third image being not including a visual object corresponding to a potential vehicle appearance, display, via, the display, another road view image representing another position of the electronic map; and
    based on the another road view image being identified as the first image including the visual object, crop the area from the first image, and display, via the display, the user interface (UI) fields.

9. The non-transitory computer readable storage medium of claim 1, when executed by the electronic device, cause the electronic device to:
    based on the road view image being identified as the third image being not including a visual object corresponding to a potential vehicle appearance, change the position of the electronic map to the another position of the electronic map without a user input; and
    display, via, the display, the another road view image representing the another position of the electronic map by changing the position of the electronic map to the another position of the electronic map.

10. The non-transitory computer readable storage medium of claim 1, the one or more programs comprising instructions which, when executed by the electronic device, cause the electronic device to:

based on the road view image being identified as a third image being not including a visual object corresponding to a potential vehicle appearance, display, another road view image representing the position of the electronic map by changing an orientation of the road view image; and based on the another road view image being identified as the first image including the visual object, crop the area from the first image, and display, via the display, the UI fields.

* * * * *